US012592223B2

(12) United States Patent
Yin

(10) Patent No.: US 12,592,223 B2
(45) Date of Patent: Mar. 31, 2026

(54) SPEECH RECOGNITION METHOD AND APPARATUS

(71) Applicant: HUAWEI TECHNOLOGIES CO., LTD., Shenzhen (CN)

(72) Inventor: Xuxian Yin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 18/258,316

(22) PCT Filed: Dec. 29, 2021

(86) PCT No.: PCT/CN2021/142470
§ 371 (c)(1),
(2) Date: Jun. 19, 2023

(87) PCT Pub. No.: WO2022/143768
PCT Pub. Date: Jul. 7, 2022

(65) Prior Publication Data
US 2024/0038223 A1    Feb. 1, 2024

(30) Foreign Application Priority Data
Dec. 31, 2020    (CN) .......................... 202011625075.0

(51) Int. Cl.
*G10L 15/16*        (2006.01)
*G10L 15/02*        (2006.01)
(Continued)

(52) U.S. Cl.
CPC .............. *G10L 15/16* (2013.01); *G10L 15/02* (2013.01); *G10L 15/063* (2013.01); *G10L 15/30* (2013.01); *G10L 2015/025* (2013.01)

(58) Field of Classification Search
CPC ....... G10L 15/16; G10L 15/02; G10L 15/063; G10L 15/26; G10L 15/30;
(Continued)

(56) References Cited

U.S. PATENT DOCUMENTS 6,151,592 A * 11/2000 Inazumi .................. G10L 15/16
                                                                      706/30
6,778,958 B1    8/2004 Nishimura et al.
(Continued)

FOREIGN PATENT DOCUMENTS

CN        102906735 B    8/2016
CN        107291704 A    10/2017
(Continued)

*Primary Examiner* — Abdelali Serrou

(57)        ABSTRACT

This application relates to a speech recognition method and apparatus. The speech recognition method includes: A terminal device inputs a to-be-recognized phoneme into a first multitask neural network model; the first multitask neural network model outputs a first prediction result, where the first prediction result includes a character prediction result and a punctuation prediction result that correspond to the to-be-recognized phoneme; and the terminal device displays at least a part of the first prediction result on a display of the terminal device. A neural network model for simultaneously predicting a character and a punctuation corresponding to a phoneme is constructed, so that the character and the punctuation corresponding to the phoneme can be simultaneously output. In addition, the neural network model is small-sized, and can be deployed on a terminal side.

16 Claims, 13 Drawing Sheets

```
                                                      ┌── S901
┌──────────────────────────────────────────────┐
│  Input a to-be-recognized phoneme into a first │
│   multitask neural network model, where the    │
│   first multitask neural network model is      │
│   obtained by training a second multitask      │
│   neural network model by using a training     │
│                   sample                       │
└──────────────────────────────────────────────┘
                                                      ┌── S902
┌──────────────────────────────────────────────┐
│  Output a first prediction result by using the │
│   first multitask neural network model, where  │
│   the first prediction result includes a       │
│   character prediction result and a punctuation│
│   prediction result that correspond to the     │
│        to-be-recognized phoneme                │
└──────────────────────────────────────────────┘
                                                      ┌── S903
┌──────────────────────────────────────────────┐
│  A terminal device displays at least a part of │
│  the first prediction result on a display of   │
│  the terminal device based on the first        │
│            prediction result                   │
└──────────────────────────────────────────────┘
```

(51) Int. Cl.
*G10L 15/06* (2013.01)
*G10L 15/30* (2013.01)

(58) Field of Classification Search
CPC ... G10L 2015/025; G06F 21/83; G06F 21/84;
G06F 3/0481; G06F 3/0483; G06F
3/04883
See application file for complete search history.

(56) References Cited

U.S. PATENT DOCUMENTS

| | | | | |
|---|---|---|---|---|
| 2017/0263241 | A1* | 9/2017 | Zhu | G10L 15/16 |
| 2017/0301344 | A1* | 10/2017 | Kaskari | G10L 15/197 |
| 2017/0372693 | A1 | 12/2017 | Rangarajan Sridhar et al. | |
| 2020/0209008 | A1* | 7/2020 | Buss | G10L 15/02 |
| 2022/0188622 | A1* | 6/2022 | Nagano | G10L 15/02 |

FOREIGN PATENT DOCUMENTS

| | | | |
|---|---|---|---|
| CN | 108597521 | A | 9/2018 |
| CN | 109448704 | A | 3/2019 |
| CN | 110010153 | A | 7/2019 |
| CN | 110473519 | A | 11/2019 |
| CN | 110880317 | A | 3/2020 |
| CN | 111261162 | A | 6/2020 |

* cited by examiner

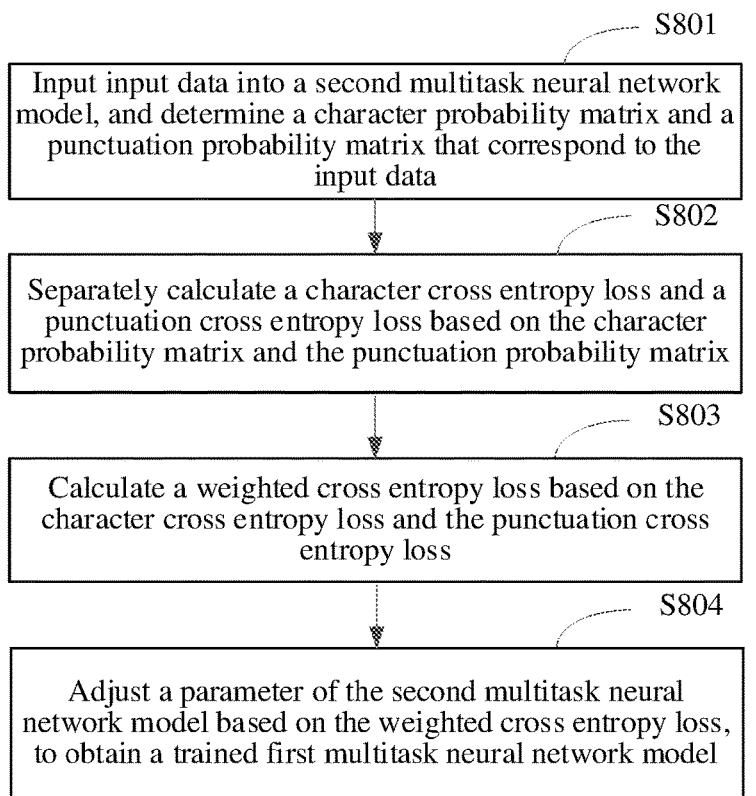

S801

Input input data into a second multitask neural network model, and determine a character probability matrix and a punctuation probability matrix that correspond to the input data

S802

Separately calculate a character cross entropy loss and a punctuation cross entropy loss based on the character probability matrix and the punctuation probability matrix

S803

Calculate a weighted cross entropy loss based on the character cross entropy loss and the punctuation cross entropy loss

S804

Adjust a parameter of the second multitask neural network model based on the weighted cross entropy loss, to obtain a trained first multitask neural network model

FIG. 8

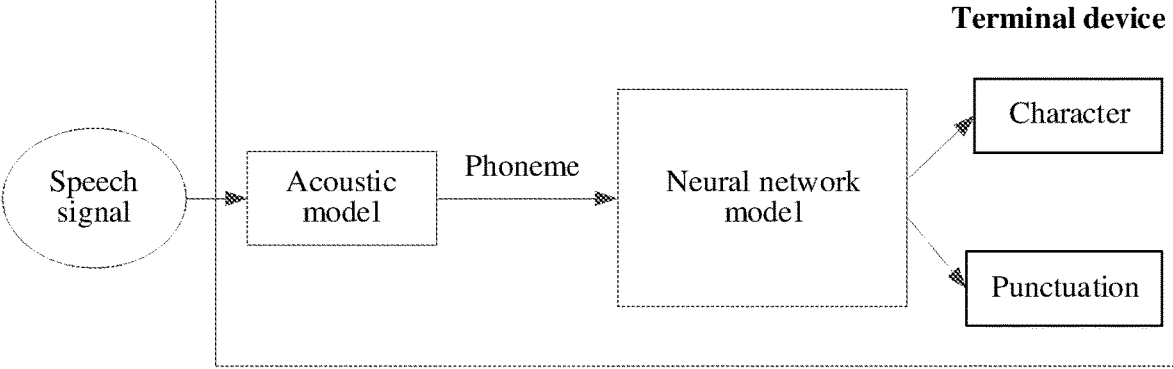

Terminal device

Speech signal

Acoustic model

Phoneme

Neural network model

Character

Punctuation

FIG. 9a

SPEECH RECOGNITION METHOD AND APPARATUS

CROSS-REFERENCE TO RELATED APPLICATIONS

This application is a National Stage of International Patent Application No. PCT/CN2021/142470, filed on Dec. 29, 2021, which claims priority to Chinese Patent Application No. 202011625075.0, filed on Dec. 31, 2020. Both of the aforementioned applications are hereby incorporated by reference in their entireties.

TECHNICAL FIELD

This application relates to the field of artificial intelligence technologies, and in particular, to a speech recognition method and apparatus.

BACKGROUND

Speech recognition, also referred to as automatic speech recognition (English full name: Automatic Speech Recognition, ASR for short) is a technology for converting a speech into a corresponding text through a computer. With development of terminal device technologies, the speech recognition technology, as an important manner for human-computer interaction, is applied in a plurality of different fields. The speech recognition technology needs to be used in many application scenarios of an electronic device, for example, translation between speeches in different languages, speech interaction between an intelligent electronic device and a user, and conversion from an instant speech signal to text information in instant messaging software.

SUMMARY

Embodiments of this application provide a speech recognition method and apparatus.

According to a first aspect, an embodiment of this application provides a speech recognition method. The method includes:

inputting, by a terminal device, a to-be-recognized phoneme into a first multitask neural network model;

outputting, by the terminal device, a first prediction result by using the first multitask neural network model, where the first prediction result includes a character prediction result and a punctuation prediction result that correspond to the to-be-recognized phoneme; and displaying, by the terminal device, at least a part of the first prediction result on a display of the terminal device based on the first prediction result.

The first multitask neural network model may be deployed on a terminal side (for example, on the terminal device) or a cloud side.

According to the speech recognition method in this implementation of this application, a neural network model for simultaneously predicting a character and a punctuation corresponding to a phoneme (that is, the first multitask neural network model, where multitask means that the neural network model needs to perform a task of predicting a character corresponding to a phoneme and a task of predicting a punctuation corresponding to the phoneme) is constructed, and the neural network model can simultaneously predict a character and a punctuation corresponding to a phoneme. A phoneme (vector) converted from a to-be-recognized speech is used as an input of the neural network model, and forward inference is performed. A character and a punctuation corresponding to the phoneme can be output at the same time. In addition, the neural network model is small-sized, and can be deployed on a terminal side. "Simultaneous", "simultaneous output", and the like described in this specification may be understood as that two types of information (for example, character information corresponding to a phoneme and punctuation information corresponding to the phoneme) can be obtained from an output of the neural network model, instead of only one type of information, and a time sequence of obtaining the two types of information is not limited. In other words, "simultaneous" described in this specification does not limit a same moment in terms of time.

According to a first possible implementation of the first aspect, the first multitask neural network model is obtained by training a second multitask neural network model by using a training sample, the training sample includes a sample statement, the sample statement includes a character, and the training sample further includes a phoneme and a punctuation that correspond to the character in the sample statement.

The second multitask neural network model may be deployed on a terminal side (for example, on the terminal device) or a cloud side.

A neural network model (that is, the second multitask neural network model) for simultaneously predicting a character and a punctuation corresponding to a phoneme is constructed, and a training sample set is constructed to train the neural network model, to obtain a trained neural network model (that is, the first multitask neural network model). In a training process, word segmentation processing may not need to be performed, a phoneme (vector) converted from a to-be-recognized speech is used as an input of the trained neural network model, forward inference is performed, and a character and a punctuation corresponding to the phoneme may be simultaneously output.

According to the first possible implementation of the first aspect, in a second possible implementation, a length of the character in the sample statement is the same as a length of the phoneme and a length of the punctuation. In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

According to a third possible implementation of the first aspect, the inputting, by a terminal device, a to-be-recognized phoneme into a first multitask neural network model, and outputting a first prediction result by using the first multitask neural network model includes: cyclically inputting, by the terminal device, the to-be-recognized phoneme into the first multitask neural network model, and outputting the first prediction result based on a length of a currently input to-be-recognized phoneme by using the first multitask neural network model. In this way, a prediction result of the to-be-recognized phoneme refers to both a previous phoneme and a subsequent phoneme, so that prediction accuracy is improved.

According to the third possible implementation of the first aspect, in a fourth possible implementation, the cyclically inputting, by the terminal device, the to-be-recognized phoneme into the first multitask neural network model, and outputting the first prediction result based on a length of a currently input to-be-recognized phoneme by using the first multitask neural network model includes:

before input of all to-be-recognized phonemes into the first multitask neural network model is completed, if the length of the currently input phoneme is less than a receptive field, continuing, by the terminal device, to input a next phoneme; or before input of all to-be-recognized phonemes into the first multitask neural network model is completed, if the length of the currently input phoneme is not less than a receptive field, obtaining, by the terminal device, a second prediction result of a first phoneme in the currently input phoneme based on a character and a punctuation of the currently input phoneme, and storing the second prediction result; and continuing, by the terminal device, to input a feature vector of the first phoneme, a phoneme other than the first phoneme in the currently input phoneme, and a next phoneme in the to-be-recognized phonemes into the first multitask neural network model;

when the input of all the to-be-recognized phonemes into the first multitask neural network model is completed, obtaining, by the terminal device, a second prediction result of the currently input phoneme based on the character and the punctuation of the currently input phoneme; and if there is no stored second prediction result, using the second prediction result of the currently input phoneme as the first prediction result of the to-be-recognized phoneme; or if there is a stored second prediction result, obtaining the first prediction result of the to-be-recognized phoneme based on the second prediction result of the currently input phoneme and the stored second prediction result.

According to the speech recognition method in the foregoing implementation of this application, the to-be-recognized phoneme output by an acoustic model is cyclically input into the first multitask neural network model with a streaming network structure, so that a prediction result of the to-be-recognized phoneme refers to both a previous phoneme and a subsequent phoneme, and prediction accuracy is improved.

According to a fifth possible implementation of the first aspect, the first multitask neural network model is a non-streaming network structure; and the outputting a first prediction result by using the first multitask neural network model includes:

outputting the first prediction result based on a relationship between a total length of the to-be-recognized phoneme and a phoneme length threshold by using the first multitask neural network model.

According to the fifth possible implementation of the first aspect, in a sixth possible implementation, the outputting the first prediction result based on a relationship between a total length of the to-be-recognized phoneme and a phoneme length threshold by using the first multitask neural network model includes:

if the total length of the to-be-recognized phoneme is less than the phoneme length threshold, outputting the first prediction result based on all to-be-recognized phonemes by using the first multitask neural network model; or if the total length of the to-be-recognized phoneme is not less than the phoneme length threshold, before input of all the to-be-recognized phonemes into the first multitask neural network model is completed, if a length of a currently input phoneme is less than the phoneme length threshold, continuing, by the terminal device, to input a next phoneme; or if a length of a currently input phoneme is not less than the phoneme length threshold, obtaining, by the terminal device, a second prediction result of a first phoneme in the currently input phoneme based on a character and a punctuation of the currently input phoneme, storing the second prediction result, and continuing, by the terminal device, to input a phoneme other than the first phoneme in the currently input phoneme and a next phoneme in the to-be-recognized phonemes into the first multitask neural network model;

if the total length of the to-be-recognized phoneme is not less than the phoneme length threshold, when the input of all the to-be-recognized phonemes into the first multitask neural network model is completed, obtaining a second prediction result of the currently input phoneme based on the character and the punctuation of the currently input phoneme; and if there is no stored second prediction result, using the second prediction result of the currently input phoneme as the first prediction result of the to-be-recognized phoneme; or if there is a stored second prediction result, obtaining the first prediction result of the to-be-recognized phoneme based on the second prediction result of the currently input phoneme and the stored second prediction result.

According to the speech recognition method in the foregoing implementation of this application, the non-streaming network structure is used, and a phoneme of which a result has been predicted does not need to be input into a network model again. Compared with the streaming network structure, the non-streaming network structure does not need to buffer a predicted historical result, so that occupied memory space is reduced. A size of the neural network model can be further reduced, so that the neural network model is easy to deploy on a terminal side. In addition, because operations such as splicing and segmentation do not need to be performed on a historical result and a currently input phoneme in a calculation process, an inference speed can be improved, and real-time output effect is remarkable in long speech recognition.

According to a second aspect, an embodiment of this application provides a neural network model training method. The method includes:

constructing a training sample, where the training sample includes a sample statement, the sample statement includes a character, and the training sample further includes a phoneme and a punctuation that correspond to the character in the sample statement; and training a second multitask neural network model by using the training sample to obtain a first multitask neural network model, where both the second multitask neural network model and the first multitask neural network model can output a first prediction result and display at least a part of the first prediction result, and the first prediction result includes a character prediction result and a punctuation prediction result.

According to the neural network training method in this implementation of this application, a neural network model for simultaneously predicting a character and a punctuation corresponding to a phoneme is constructed, and a training sample set is constructed to train the neural network model, to obtain a trained neural network model. In a training process, word segmentation processing may not need to be performed, a phoneme (vector) converted from a to-berecognized speech is used as an input of the trained neural network model, forward inference is performed, and a character and a punctuation corresponding to the phoneme may be simultaneously output. In addition, the neural network model is small-sized, and can be deployed on a terminal side.

According to a first possible implementation of the second aspect, the constructing a training sample may include:

performing phonetic annotation on the character in the sample statement based on a phonetic annotation dictionary to obtain the phoneme corresponding to the character, and aligning the phoneme corresponding to the character with the character and the punctuation, so that a length of the character in the sample statement is the same as a length of the phoneme and a length of the punctuation.

According to the first possible implementation of the second aspect, in a second possible implementation, the aligning the phoneme corresponding to the character with the character and the punctuation includes:

for a Chinese polyphonic character, selecting any phoneme from a plurality of phonemes corresponding to the polyphonic character as a phoneme corresponding to the polyphonic character, where a phoneme corresponding to an aligned Chinese polyphonic character is any one of a plurality of phonemes corresponding to the polyphonic character;

for an English character, adding an alignment character to the character for alignment with a length of a phoneme corresponding to the character, where an aligned English character includes the alignment character, and a length of the aligned English character is the same as the length of the phoneme corresponding to the English character; and if there is no punctuation after the character, setting a punctuation corresponding to the character to blank, so that a length of the punctuation is aligned with the length of the character, where for a character having no punctuation before alignment, an aligned punctuation is blank.

In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

According to a third possible implementation of the second aspect, the training a second multitask neural network model by using the training sample to obtain a first multitask neural network model includes:

inputting the training sample into the second multitask neural network model, and determining a character probability matrix and a punctuation probability matrix that correspond to the training sample;

separately calculating a character cross entropy loss and a punctuation cross entropy loss based on the character probability matrix and the punctuation probability matrix;

calculating a weighted cross entropy loss based on the character cross entropy loss, a first weight corresponding to the character cross entropy loss, the punctuation cross entropy loss, and a second weight corresponding to the punctuation cross entropy loss; and adjusting a parameter of the second multitask neural network model based on the weighted cross entropy loss, to obtain the trained first multitask neural network model.

According to the multitask neural network model training method in this application, simultaneous training for both character prediction and punctuation prediction tasks can be implemented. In addition, because a constructed training sample set includes a plurality of languages, the multitask neural network model training method in this application may further implement training for a recognition (prediction) task for the plurality of languages. A multitask neural network model trained according to the multitask neural network model training method in this implementation of this application can simultaneously perform prediction for a plurality of languages and punctuations. In addition, compared with a conventional acoustic model, the multitask neural network model is small-sized, and can be deployed on a terminal side.

According to a third aspect, an embodiment of this application provides a speech recognition apparatus. The apparatus includes:

an input module, configured to input a to-be-recognized phoneme into a first multitask neural network model;

an inference module, configured to output a first prediction result by using the first multitask neural network model, where the first prediction result includes a character prediction result and a punctuation prediction result that correspond to the to-be-recognized phoneme; and a display module, configured to display at least a part of the first prediction result on a display of a terminal device based on the first prediction result.

According to the speech recognition apparatus in this implementation of this application, a neural network model for simultaneously predicting a character and a punctuation corresponding to a phoneme is constructed. A phoneme (vector) converted from a to-be-recognized speech is used as an input of the neural network model, and forward inference is performed. A character and a punctuation corresponding to the phoneme can be output at the same time. In addition, the neural network model is small-sized, and can be deployed on a terminal side.

According to a first possible implementation of the third aspect, the first multitask neural network model is obtained by training a second multitask neural network model by using a training sample, the training sample includes a sample statement, the sample statement includes a character, and the training sample further includes a phoneme and a punctuation that correspond to the character in the sample statement.

A neural network model (that is, the second multitask neural network model) for simultaneously predicting a character and a punctuation corresponding to a phoneme is constructed, and a training sample set is constructed to train the neural network model, to obtain a trained neural network model (that is, the first multitask neural network model). In a training process, word segmentation processing may not need to be performed, a phoneme (vector) converted from a to-be-recognized speech is used as an input of the trained neural network model, forward inference is performed, and a character and a punctuation corresponding to the phoneme may be simultaneously output.

According to the first possible implementation of the third aspect, in a second possible implementation, a length of the character in the sample statement is the same as a length of the phoneme and a length of the punctuation.

In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

According to a third possible implementation of the third aspect, the first multitask neural network model is a streaming network structure; the input module includes: a first input unit, configured to cyclically input the to-be-recognized phoneme into the first multitask neural network model; and the inference module includes: a first inference unit, configured to output the first prediction result based on a length of a currently input to-be-recognized phoneme by using the first multitask neural network model. In this way, a prediction result of the to-be-recognized phoneme refers to both a previous phoneme and a subsequent phoneme, so that prediction accuracy is improved.

According to the third possible implementation of the third aspect, in a fourth possible implementation, the first input unit is further configured to: before input of all to-be-recognized phonemes into the first multitask neural network model is completed, if the length of the currently input phoneme is less than a receptive field, continue to input a next phoneme; or before input of all to-be-recognized phonemes into the first multitask neural network model is completed, if the length of the currently input phoneme is not less than a receptive field, the first inference unit is configured to obtain a second prediction result of a first phoneme in the currently input phoneme based on a character and a punctuation of the currently input phoneme, and store the second prediction result; and the first input unit is further configured to continue to input a feature vector of the first phoneme, a phoneme other than the first phoneme in the currently input phoneme, and a next phoneme in the to-be-recognized phonemes into the first multitask neural network model. The first inference unit is further configured to: when the input of all the to-be-recognized phonemes into the first multitask neural network model is completed, obtain a second prediction result of the currently input phoneme based on the character and the punctuation of the currently input phoneme; and if there is no stored second prediction result, use the second prediction result of the currently input phoneme as the first prediction result of the to-be-recognized phoneme; or if there is a stored second prediction result, obtain the first prediction result of the to-be-recognized phoneme based on the second prediction result of the currently input phoneme and the stored second prediction result.

According to the speech recognition apparatus in the foregoing implementation of this application, the to-be-recognized phoneme output by an acoustic model is cyclically input into the first multitask neural network model with a streaming network structure, so that a prediction result of the to-be-recognized phoneme refers to both a previous phoneme and a subsequent phoneme, and prediction accuracy is improved.

According to a fifth possible implementation of the third aspect, the first multitask neural network model is a non-streaming network structure; and the inference module includes: a second inference unit, configured to output the first prediction result based on a relationship between a total length of the to-be-recognized phoneme and a phoneme length threshold by using the first multitask neural network model.

According to the fifth possible implementation of the third aspect, in a sixth possible implementation, the second inference unit is further configured to: if the total length of the to-be-recognized phoneme is less than the phoneme length threshold, output the first prediction result based on all to-be-recognized phonemes by using the first multitask neural network model; or if the total length of the to-be-recognized phoneme is not less than the phoneme length threshold, before input of all the to-be-recognized phonemes into the first multitask neural network model is completed, if a length of a currently input phoneme is less than the phoneme length threshold, continue to input a next phoneme; or if a length of a currently input phoneme is not less than the phoneme length threshold, obtain a second prediction result of a first phoneme in the currently input phoneme based on a character and a punctuation of the currently input phoneme, store the second prediction result, and continue to input a phoneme other than the first phoneme in the currently input phoneme and a next phoneme in the to-be-recognized phonemes into the first multitask neural network model;

if the total length of the to-be-recognized phoneme is not less than the phoneme length threshold, when the input of all the to-be-recognized phonemes into the first multitask neural network model is completed, obtain a second prediction result of the currently input phoneme based on the character and the punctuation of the currently input phoneme; and if there is no stored second prediction result, use the second prediction result of the currently input phoneme as the first prediction result of the to-be-recognized phoneme; or if there is a stored second prediction result, obtain the first prediction result of the to-be-recognized phoneme based on the second prediction result of the currently input phoneme and the stored second prediction result.

According to the speech recognition apparatus in the foregoing implementation of this application, the non-streaming network structure is used, and a phoneme of which a result has been predicted does not need to be input into a network model again. Compared with the streaming network structure, the non-streaming network structure does not need to buffer a predicted historical result, so that occupied memory space is reduced. A size of the neural network model can be further reduced, so that the neural network model is easy to deploy on a terminal side. In addition, because operations such as splicing and segmentation do not need to be performed on a historical result and a currently input phoneme in a calculation process, an inference speed can be improved, and real-time output effect is remarkable in long speech recognition.

According to a fourth aspect, an embodiment of this application provides a neural network model training apparatus. The apparatus includes:

a construction module, configured to construct a training sample, where the training sample includes a sample statement, the sample statement includes a character, and the training sample further includes a phoneme and a punctuation that correspond to the character in the sample statement; and a training module, configured to train a second multitask neural network model by using the training sample to obtain a first multitask neural network model, where both the second multitask neural network model and the first multitask neural network model can output a first prediction result and display at least a part of the first prediction result, and the first prediction result includes a character prediction result and a punctuation prediction result.

According to the neural network training apparatus in this implementation of this application, a neural network model for simultaneously predicting a character and a punctuation corresponding to a phoneme is constructed, and a training sample set is constructed to train the neural network model, to obtain a trained neural network model. In a training process, word segmentation processing may not need to be performed, a phoneme (vector) converted from a to-be-recognized speech is used as an input of the trained neural network model, forward inference is performed, and a character and a punctuation corresponding to the phoneme may be simultaneously output. In addition, the neural network model is small-sized, and can be deployed on a terminal side.

According to a first possible implementation of the fourth aspect, the construction module includes:

an alignment unit, configured to perform phonetic annotation on the character in the sample statement based on a phonetic annotation dictionary to obtain the phoneme corresponding to the character, and align the phoneme corresponding to the character with the character and the punctuation, so that a length of the character in the sample statement is the same as a length of the phoneme and a length of the punctuation.

According to the first possible implementation of the fourth aspect, in a second possible implementation, the alignment unit is further configured to:

for a Chinese polyphonic character, select any phoneme from a plurality of phonemes corresponding to the polyphonic character as a phoneme corresponding to the polyphonic character, where a phoneme corresponding to an aligned Chinese polyphonic character is any one of a plurality of phonemes corresponding to the polyphonic character;

for an English character, add an alignment character to the character for alignment with a length of a phoneme corresponding to the character, where an aligned English character includes the alignment character, and a length of the aligned English character is the same as the length of the phoneme corresponding to the English character; and if there is no punctuation after the character, set a punctuation corresponding to the character to blank, so that a length of the punctuation is aligned with the length of the character, where for a character having no punctuation before alignment, an aligned punctuation is blank.

In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

According to a third possible implementation of the fourth aspect, the training module includes:

a determining unit, configured to input the training sample into the second multitask neural network model, and determine a character probability matrix and a punctuation probability matrix that correspond to the training sample;

a first calculation unit, configured to separately calculate a character cross entropy loss and a punctuation cross entropy loss based on the character probability matrix and the punctuation probability matrix;

a second calculation unit, configured to calculate a weighted cross entropy loss based on the character cross entropy loss, a first weight corresponding to the character cross entropy loss, the punctuation cross entropy loss, and a second weight corresponding to the punctuation cross entropy loss; and an adjustment unit, configured to adjust a parameter of the second multitask neural network model based on the weighted cross entropy loss, to obtain the trained first multitask neural network model.

According to the multitask neural network model training apparatus in this application, simultaneous training for both character prediction and punctuation prediction tasks can be implemented. In addition, because a constructed training sample set includes a plurality of languages, the multitask neural network model training method in this application may further implement training for a recognition (prediction) task for the plurality of languages. A multitask neural network model trained according to the multitask neural network model training apparatus in this implementation of this application can simultaneously perform prediction for a plurality of languages and punctuations. In addition, compared with a conventional acoustic model, the multitask neural network model is small-sized, and can be deployed on a terminal side.

According to a fifth aspect, an embodiment of this application provides a speech recognition apparatus, including: a processor; and a memory configured to store instructions executable for the processor, where the processor is configured to implement the speech recognition method according to one or more of the first aspect or the plurality of possible implementations of the first aspect when executing the instructions.

According to a sixth aspect, an embodiment of this application provides a neural network model training apparatus, including: a processor; and a memory configured to store instructions executable for the processor, where the processor is configured to implement the neural network model training method according to one or more of the second aspect or the plurality of possible implementations of the second aspect when executing the instructions.

According to a seventh aspect, an embodiment of this application provides a non-volatile computer-readable storage medium. The non-volatile computer-readable storage medium stores computer program instructions, and when the computer program instructions are executed by a processor, the speech recognition method according to one or more of the first aspect or the plurality of possible implementations of the first aspect is implemented, or the neural network model training method according to one or more of the second aspect or the plurality of possible implementations of the second aspect is implemented.

These aspects and other aspects of this application are more concise and understandable in descriptions of the following (plurality of) embodiments.

BRIEF DESCRIPTION OF DRAWINGS

The accompanying drawings included in this specification and constituting a part of this specification and this specification jointly show example embodiments, features, and aspects of this application, and are intended to explain principles of this application.

FIG. 8 is a flowchart of a multitask neural network model training method according to an implementation of this application;

FIG. 9*a* is a schematic diagram of an application scenario in which speech recognition is performed on a terminal device side according to an implementation of this application;

DESCRIPTION OF EMBODIMENTS

Figure 1:
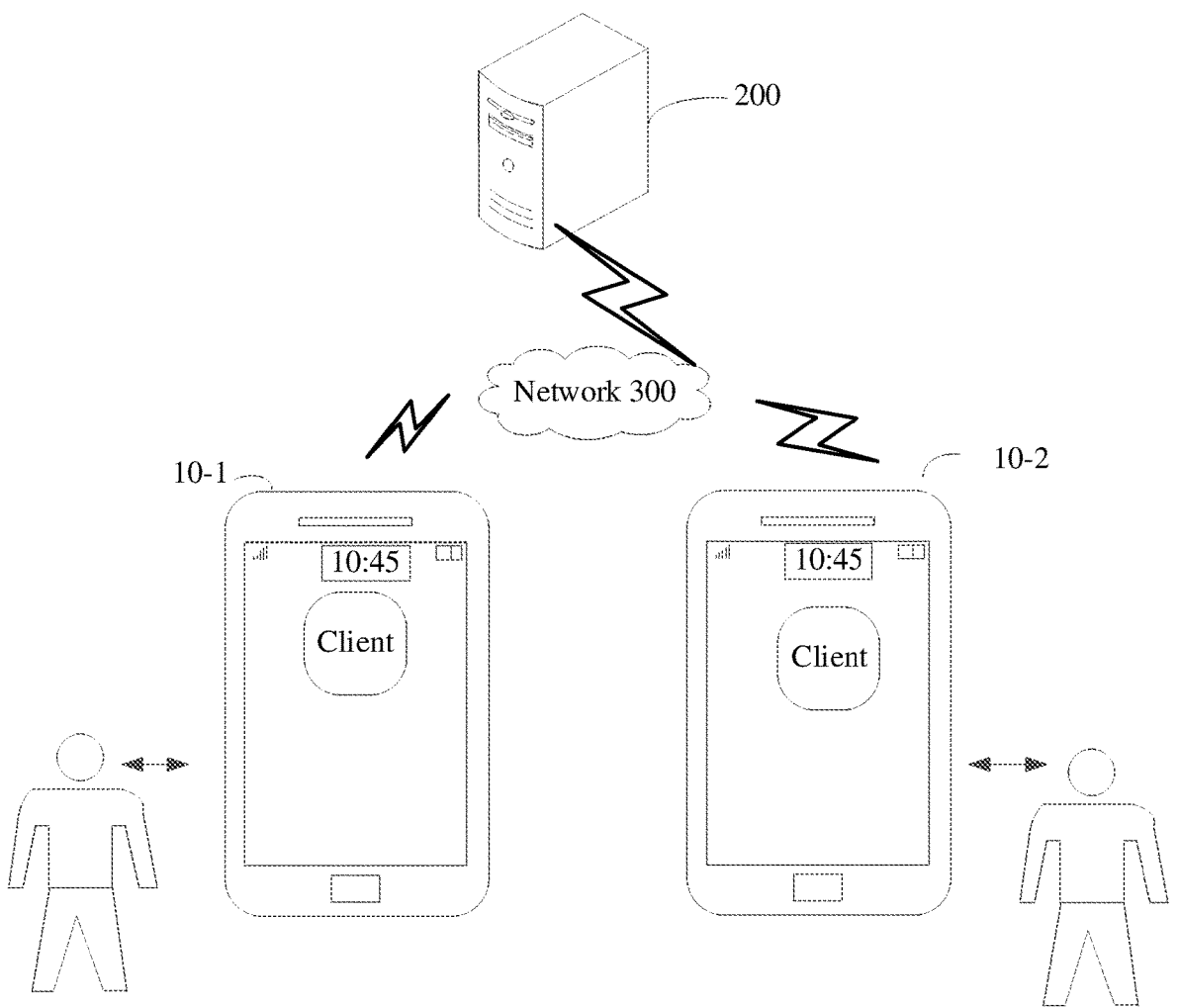
FIG. 1 shows an application scenario of a speech recognition method according to an implementation of this application.

Various example embodiments, features, and aspects of this application are described in detail below with reference to the accompanying drawings. Identical reference numerals in the accompanying drawings indicate elements that have same or similar functions. Although various aspects of the embodiments are shown in the accompanying drawings, the accompanying drawings are not necessarily drawn to scale, unless otherwise specified.

The specific term "example" herein means "used as an example, an embodiment, or an illustration". Any embodiment described as "example" herein is not necessarily explained as being superior or better than another embodiment.

In addition, to better describe this application, numerous specific details are provided in the following specific implementations. A person skilled in the art should understand that this application may still be implemented without specific details. In some embodiments, methods, means, elements, and circuits that are well-known to a person skilled in the art are not described in detail, so that the subject matter of this application is highlighted.

Conventional speech recognition implements conversion from a phoneme to a character (which means conversion from Pinyin to a Chinese character in Chinese) by using a statistics-based N-Gram language model. A model required in this method is large, is usually at a GB level, and cannot be deployed on a terminal side.

Conventional punctuation prediction is performed after speech recognition ends. Especially, in long speech recognition, a punctuation cannot be output when a converted character is output. In a related technology, a training text and a dictionary file are constructed by using a punctuation mark as a part of a word, to train a language model to achieve an effect of outputting a punctuation mark while outputting a text. However, a 3-gram model is used for an acoustic model, word segmentation processing needs to be performed on a sentence in a training process, and the acoustic model aligns phonemes by using a Gaussian mixture model and a hidden Markov model. A processing process is complex, and consequently, the acoustic model is large, and cannot be deployed on a terminal side. In addition, because the acoustic model is used for punctuation prediction, adjustment cannot be performed based on a context, and prediction accuracy is low.

Therefore, in a related speech recognition technology, there is a technical problem that a model cannot be deployed on a terminal side, and prediction accuracy of predicting a punctuation by using an acoustic model is low.

To resolve the foregoing technical problem, this application provides a speech recognition method. FIG. 1 shows an application scenario of a speech recognition method according to an implementation of this application. As shown in FIG. 1, a speech recognition software client is disposed on terminal devices (including a terminal device 10-1 and a terminal device 10-2). A user may enter, by using the disposed speech recognition software client, a corresponding statement on which speech recognition is to be performed. A chat client may receive a corresponding speech recognition result, and display the received speech recognition result to the user, or perform a task that matches a speech instruction. The terminal device is connected to a server 200 through a network 300. The network 300 may be a wide area network, a local area network, or a combination thereof, and may implement data transmission through a wired link or a wireless link. A manner of transmitting data by using a wireless link in FIG. 1 is merely an example of this application. This application is not limited in any manner.

In an example, the server 200 is configured to deploy a speech recognition model, train the speech recognition model, and deploy a trained speech recognition model in a corresponding terminal device. In addition, the terminal device processes speech information in a media asset usage environment by using the deployed speech recognition model. The speech recognition model may be a second multitask neural network model or a first multitask neural network model provided in embodiments of this application. The speech recognition model deployed on the server 200 before training may be the second multitask neural network model. The trained speech recognition model deployed in the terminal device may be the first multitask neural network model. Both the second multitask neural network model and the first multitask neural network model incorporate a plurality of tasks that can accurately predict a character and a punctuation at the same time. The models are small-sized, and can be deployed on a terminal side.

Certainly, before speech information is processed by using a speech recognition model to generate a corresponding speech recognition result, the speech recognition model further needs to be trained. Details include: constructing a training sample, where the training sample includes a sample statement, the sample statement includes a character, and the training sample further includes a phoneme and a punctuation that correspond to the character in the sample statement; and training a second multitask neural network model by using the training sample to obtain a first multitask neural network model.

The speech recognition method provided in embodiments of this application is implemented based on artificial intelligence. Artificial intelligence (AI) is a theory, a method, a technology, and an application system that simulate and extend human intelligence by using a digital computer or a machine controlled by a digital computer, perceive an environment, obtain knowledge, and use the knowledge to obtain an optimal result. In other words, artificial intelligence is a comprehensive technology in computer science, and aims to understand the essence of intelligence and produce a new intelligent machine that can react in a manner similar to human intelligence. Artificial intelligence is to study design principles and implementation methods of various intelligent machines, so that the machines have perception, inference, and decision-making functions.

The artificial intelligence technology is a comprehensive subject, and relates to a wide range of fields, including both hardware and software technologies. Basic technologies of artificial intelligence generally include technologies such as a sensor, a special-purpose artificial intelligence chip, cloud computing, distributed storage, a big data processing technology, an operation/interaction system, and mechatronics. Software technologies of artificial intelligence mainly include a computer vision technology, a voice processing technology, a natural language processing technology, machine learning/deep learning, and the like.

In embodiments of this application, mainly related artificial intelligence software technologies include the foregoing speech processing technology, machine learning, and the like. For example, a speech recognition technology (Automatic Speech Recognition, ASR) in a speech technology may be involved, including speech signal preprocessing, speech signal frequency analyzing, speech signal feature extraction, speech signal feature matching/recognition, speech training, and the like.

For example, machine learning (ML) may be involved. Machine learning is a multi-field interdiscipline, and relates to a plurality of disciplines such as a probability theory, statistics, an approximation theory, convex analysis, and an algorithm complexity theory. The machine learning technology focuses on a study of how a computer simulates or implements learning behavior of human beings to obtain new knowledge or skills, and reorganizes an existing knowledge structure to continuously improve performance of the computer. Machine learning is the core of artificial intelligence and the fundamental way to make computers intelligent, and is widely used in various fields of artificial intelligence. Machine learning usually includes technologies such as deep learning, and deep learning includes an artificial neural network, for example, a convolutional neural network (CNN), a recurrent neural network (RNN), or a deep neural network (DNN).

It may be understood that the speech recognition model training method and speech recognition provided in this application may be applied to an intelligent device. The intelligent device may be any device with a speech instruction recognition function, for example, may be an intelligent terminal, a smart home device (such as a smart speaker or a smart washing machine), a smart wearable device (such as a smartwatch), an in-vehicle intelligent central control system (where applets for performing different tasks in a terminal are woken up by using speech instructions), or an AI intelligent medical device (which is woken up and triggered by using a speech instruction).

Figure 2:
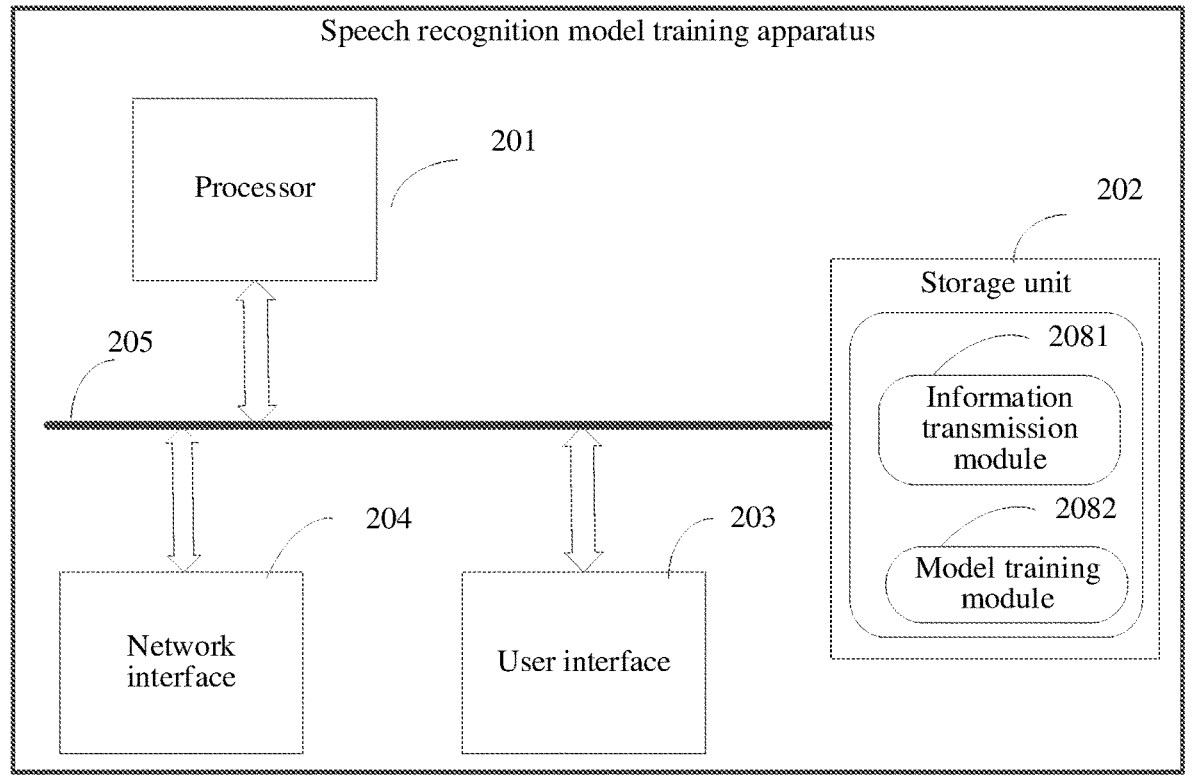
FIG. 2 is a schematic diagram of a composition structure of a speech recognition model training apparatus according to an embodiment of this application.

The following describes in detail a structure of a speech recognition model training apparatus in embodiments of this application. The speech recognition model training apparatus may be implemented in various forms, for example, may be a dedicated terminal with a speech recognition model training function, or may be a server provided with a speech recognition model training function, for example, the server 200 in FIG. 1. FIG. 2 is a schematic diagram of a composition structure of a speech recognition model training apparatus according to an embodiment of this application. It may be understood that FIG. 2 shows only an example structure instead of an entire structure of the speech recognition model training apparatus, and a partial structure or the entire structure shown in FIG. 2 may be implemented according to a requirement.

The speech recognition model training apparatus provided in this embodiment of this application includes at least one processor 201, a storage unit 202, a user interface 203, and at least one network interface 204. Components in the speech recognition model training apparatus are coupled together by using a bus system 205. It may be understood that the bus system 205 is configured to implement connection and communication between these components. In addition to a data bus, the bus system 205 further includes a power bus, a control bus, and a status signal bus. However, for clear description, various buses are referred to as the bus system 205 in FIG. 2.

The user interface 203 may include a display, a keyboard, a mouse, a trackball, a click wheel, a key, a button, a touchpad, a touchscreen, or the like.

It may be understood that the storage unit 202 may be a volatile memory or a non-volatile memory, or may include both a volatile memory and a non-volatile memory. The storage unit 202 in this embodiment of this application can store data to support an operation of a terminal device (for example, 10-1). An example of such data includes any computer program, such as an operating system and an application, for performing an operation on the terminal device (for example, 10-1). The operating system includes various system programs, for example, a framework layer, a kernel library layer, and a driver layer, and is configured to implement various basic services and process a hardware-based task. The application may include various applications.

In some embodiments, the speech recognition model training apparatus provided in this embodiment of this application may be implemented by combining software and hardware. For example, the speech recognition model training apparatus provided in this embodiment of this application may be a processor in a form of a hardware decoding processor, which is programmed to perform the speech recognition model training method provided in embodiments of this application. For example, the processor in a form of a hardware decoding processor may be one or more application-specific integrated circuits (ASIC), a DSP, a programmable logic device (PLD), a complex programmable logic device (CPLD), a field-programmable gate array (FPGA), or another electronic component.

In an example in which the speech recognition model training apparatus provided in this embodiment of this application is implemented by combining software and hardware, the speech recognition model training apparatus provided in this embodiment of this application may be directly embodied as a combination of software modules executed by the processor 201. The software module may be located in a storage medium, and the storage medium is located in the storage unit 202. The processor 201 reads an executable instruction included in the software module in the storage unit 202, and completes the speech recognition model training method in embodiments of this application in combination with necessary hardware (for example, including the processor 201 and another component connected to the bus system 205).

For example, the processor 201 may be an integrated circuit chip that has a signal processing capability, for example, a general-purpose processor, a digital signal processor (DSP), another programmable logic device, a discrete gate or transistor logic device, or a discrete hardware component. The general-purpose processor may be a microprocessor, any conventional processor, or the like.

In an example in which the speech recognition model training apparatus provided in this embodiment of this application is implemented by using hardware, the apparatus provided in this embodiment of this application may be directly executed by using the processor 201 in a form of a hardware decoding processor, for example, executed by one or more application-specific integrated circuits (ASIC), a DSP, a programmable logic device (PLD), a complex programmable logic device (CPLD), a field-programmable gate array (FPGA), or another electronic component to implement the speech recognition model training method provided in embodiments of this application.

The storage unit 202 in this embodiment of this application is configured to store various types of data to support an operation of the speech recognition model training apparatus. An example of such data includes any executable instruction for performing an operation on the speech recognition model training apparatus.

In some other embodiments, the speech recognition model training apparatus provided in this embodiment of this application may be implemented in a software manner. FIG. 2 shows a speech recognition model training apparatus stored in the storage unit 202. The speech recognition model training apparatus may be software in a form of a program or a plug-in, and includes a series of modules. An example of the program stored in the storage unit 202 may include the speech recognition model training apparatus, and the speech recognition model training apparatus includes the following software modules: a construction module, configured to construct a training sample, where the training sample includes a sample statement, the sample statement includes a character, and the training sample further includes a phoneme and a punctuation that correspond to the character in the sample statement; and a training module, configured to train a second multitask neural network model by using the training sample to obtain a first multitask neural network model. Both the second multitask neural network model and the first multitask neural network model can output a first prediction result and display at least a part of the first prediction result. The first prediction result includes a character prediction result and a punctuation prediction result.

The speech recognition method provided in embodiments of this application may be applied to a terminal device such as a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA), and may be further applied to a database, a server, and a service response system based on terminal artificial intelligence, to respond to a speech recognition request. A specific type of the terminal device is not limited in embodiments of this application.

For example, the terminal device may be a station (ST) in a WLAN, or may be a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a computer, a laptop computer, a handheld communication device, a handheld computing device, another device used for communication in a wireless system, a mobile terminal in a next-generation communication system such as a 5G network, and/or a mobile terminal in a future evolved public land mobile network (PLMN).

By way of example and not limitation, when the terminal device is a wearable device, the wearable device may be a general name of wearable devices developed by performing intelligent design on daily wear by using a wearable technology, for example, glasses, gloves, a watch, clothing, and shoes. The wearable device is a portable device that is directly worn on a body or integrated into clothes or an accessory of a user, and is attached to the body of the user to collect an atrial fibrillation signal of the user. The wearable device is not only a hardware device, but also implements a powerful function through software support, data exchange, and cloud interaction. Generalized wearable intelligent devices include full-featured and large-sized devices that can implement complete or partial functions without depending on a smartphone, for example, a smartwatch or smart glasses, and devices that focus on only one type of application function and need to work with another device such as a smartphone, for example, various smart bands or smart jewelry for monitoring physical signs.

Figure 3:
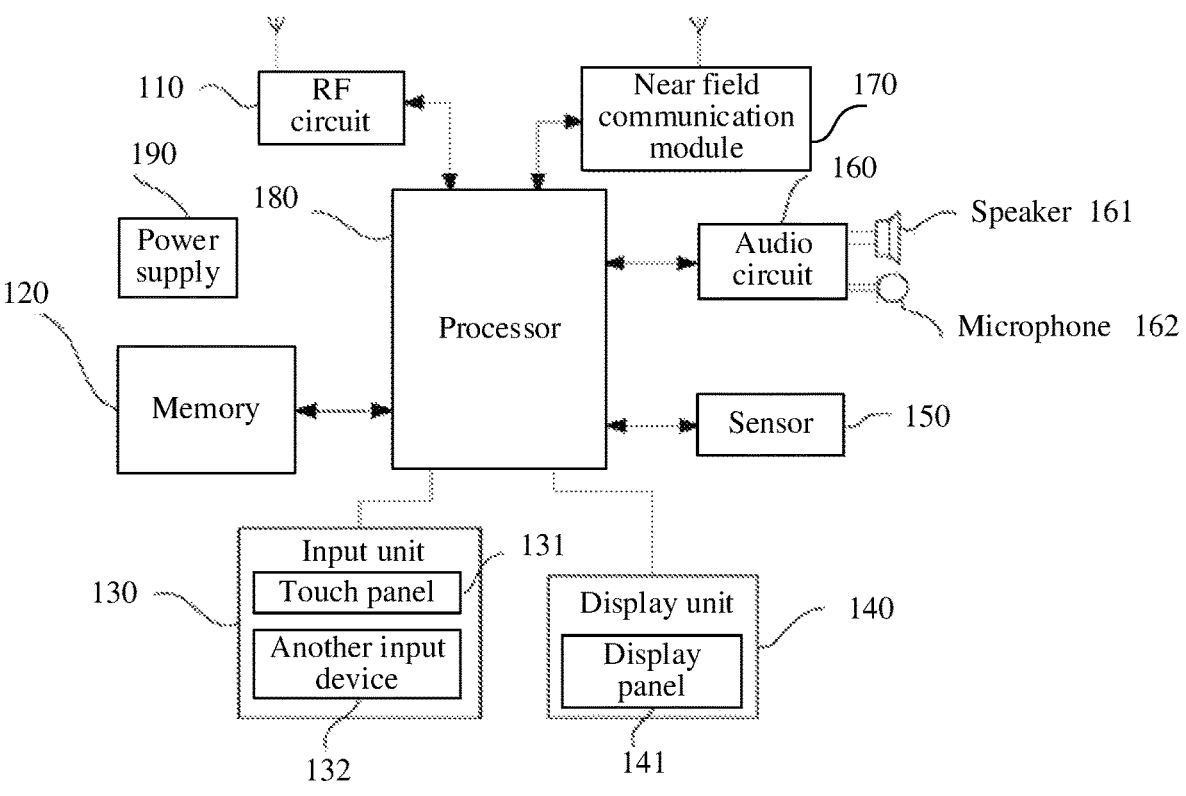
FIG. 3 is a block diagram of a partial structure of a mobile phone according to an embodiment of this application.

An example in which the terminal device is a mobile phone is used. FIG. 3 is a block diagram of a partial structure of a mobile phone according to an embodiment of this application. As shown in FIG. 3, the mobile phone includes components such as a radio frequency (RF) circuit 110, a memory 120, an input unit 130, a display unit 140, a sensor 150, an audio circuit 160, a near field communication module 170, a processor 180, and a power supply 190. A person skilled in the art may understand that a structure of the mobile phone shown in FIG. 3 does not constitute a limitation on the mobile phone, and the mobile phone may include more or fewer components than those shown in the figure, or combine some components, or have a different component arrangement.

Each component of the mobile phone is described below in detail with reference to FIG. 3.

The RF circuit 110 may be configured to receive and send signals in an information sending/receiving process or a call process. In particular, after receiving downlink information from a base station, the RF circuit 110 sends the downlink information to the processor 180 for processing. In addition, the RF circuit 110 sends related uplink data to the base station. Generally, the RF circuit includes but is not limited to an antenna, at least one amplifier, a transceiver, a coupler, a low noise amplifier (LNA), a duplexer, or the like. In addition, the RF circuit 110 may further communicate with a network and another device through wireless communication. The wireless communication may use any communication standard or protocol, including but not limited to a global system for mobile communications (GSM), a general packet radio service (GPRS), code division multiple access (CDMA), wideband code division multiple access (WCDMA), long term evolution (LTE), an email, a short messaging service (SMS), and the like. A speech signal collected by another terminal is received by using the RF circuit 110, and the speech signal is recognized, to output corresponding text information.

The memory 120 may be configured to store a software program and a module. The processor 180 performs various function applications of the mobile phone and data processing by running the software program and the module stored in the memory 120, for example, stores a trained real-time speech recognition algorithm in the memory 120. The memory 120 may mainly include a program storage area and a data storage area. The program storage area may store an operating system, an application program required by at least one function (for example, a sound play function or an image play function), and the like. The data storage area may store data (such as audio data or a phone book) created based on use of the mobile phone. In addition, the memory 120 may include a high-speed random access memory, or may include a non-volatile memory, such as at least one magnetic disk storage device, a flash storage device, or another volatile solid-state storage device.

The input unit 130 may be configured to receive entered digit or character information, and generate a key signal input related to a user setting and function control of the mobile phone 100. Specifically, the input unit 130 may include a touch panel 131 and another input device 132. The touch panel 131, also referred to as a touchscreen, may collect a touch operation performed by a user on or near the touch panel 131 (for example, an operation performed by the user on or near the touch panel 131 by using any suitable object or accessory such as a finger or a stylus), and drive a corresponding connection apparatus according to a preset program.

The display unit 140 may be configured to display information entered by the user or information provided for the user and various menus of the mobile phone, for example, output text information obtained through speech recognition. The display unit 140 may include a display panel 141. Optionally, the display panel 141 may be configured in a form of a liquid crystal display (LCD), an organic light-emitting diode (OLED), or the like. Further, the touch panel 131 may cover the display panel 141. After detecting a touch operation on or near the touch panel 131, the touch panel 131 transmits the touch operation to the processor 180 to determine a type of a touch event. Then, the processor 180 provides a corresponding visual output on the display panel 141 according to the type of the touch event. Although in FIG. 3, the touch panel 131 and the display panel 141 are used as two independent components to implement input and output functions of the mobile phone, in some embodiments, the touch panel 131 and the display panel 141 may be integrated to implement the input and output functions of the mobile phone.

The mobile phone 100 may further include at least one sensor 150, such as a light sensor, a motion sensor, and another sensor. Specifically, the light sensor may include an ambient light sensor and a proximity sensor. The ambient light sensor may adjust brightness of the display panel 141 based on brightness of ambient light, and the proximity sensor may turn off the display panel 141 and/or backlight when the mobile phone approaches an ear. As a type of motion sensor, an accelerometer sensor can detect acceleration in various directions (usually on three axes), can detect a magnitude and a direction of gravity when being stationary, and can be used to recognize application of a mobile phone posture (for example, switching between landscape mode and portrait mode, a related game, and magnetometer posture calibration), a function related to vibration recognition (such as a pedometer and a tap), and the like. For other sensors such as a gyroscope, a barometer, a hygrometer, a thermometer, and an infrared sensor that can be further configured for the mobile phone, details are not described herein again.

The audio circuit 160, a speaker 161, and a microphone 162 may provide an audio interface between a user and the mobile phone. The audio circuit 160 may transmit an electrical signal converted from received audio data to the speaker 161, and the speaker 161 converts the electrical signal into a sound signal for output. In addition, the microphone 162 converts a collected sound signal into an electrical signal, and the electrical signal is received by the audio circuit 160 and converted into audio data. After the audio data is output to the processor 180 for processing, processed data is sent to, for example, another mobile phone by using the RF circuit 110. Alternatively, the audio data is output to the memory 120 for further processing. For example, the terminal device may collect a target speech signal of the user by using the microphone 162, and send a converted electrical signal to the processor of the terminal device for speech recognition.

The terminal device may receive, by using the near field communication module 170, an atrial fibrillation signal sent by another device. For example, the near field communication module 170 integrates a Bluetooth communication module, establishes a communication connection to a wearable device by using the Bluetooth communication module, and receives a target speech signal fed back by the wearable device. Although FIG. 3 shows the near field communication module 170, it may be understood that the near field communication module 170 is not a mandatory component of the mobile phone 100, and may be omitted as required without changing the essence of this application.

The processor 180 is a control center of the mobile phone and is connected to each part of the entire mobile phone by using various interfaces and lines. By running or executing the software program and/or module stored in the memory 120 and invoking data stored in the memory 120, the processor 180 performs various functions of the mobile phone and processes data, to perform overall monitoring on the mobile phone. Optionally, the processor 180 may include one or more processing units. Preferably, the processor 180 may be integrated with an application processor and a modem processor. The application processor mainly processes an operating system, a user interface, an application program, and the like, and the modem processor mainly processes wireless communication. It may be understood that the modem processor may alternatively not be integrated into the processor 180.

The mobile phone 100 further includes the power supply 190 (for example, a battery) that supplies power to each component. Preferably, the power supply may be logically connected to the processor 180 by using a power management system, to implement functions such as charging management, discharging management, and power consumption management by using the power management system.

Figure 4:
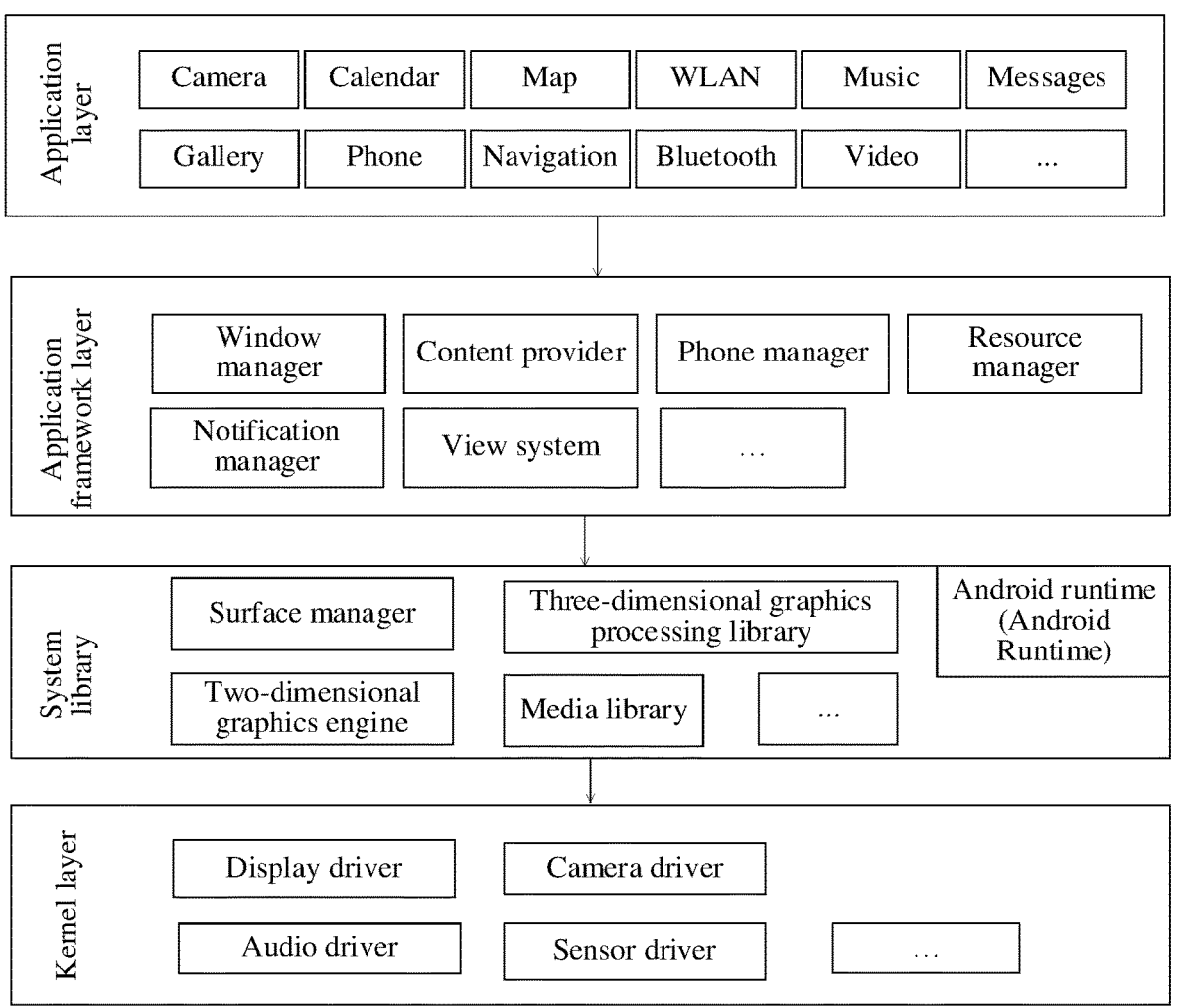
FIG. 4 is a schematic diagram of a software structure of a mobile phone 100 according to an embodiment of this application.

FIG. 4 is a schematic diagram of a software structure of a mobile phone 100 according to an embodiment of this application. For example, an operating system of the mobile phone 100 is an Android system. In some embodiments, the Android system is divided into four layers: an application layer, an application framework (framework, FWK) layer, a system layer, and a hardware abstraction layer. Layers communicate with each other by using a software interface.

As shown in FIG. 4, the application layer may include a series of application packages, and the application packages may include applications such as Messages, Calendar, Camera, Video, Navigation, Gallery, and Phone. In particular, a speech recognition algorithm may be embedded in an application, a speech recognition procedure is started by using a related control in the application, and a collected target speech signal is processed to obtain corresponding text information.

The application framework layer provides an application programming interface (API) and a programming framework for applications at the application layer. The application framework layer may include some predefined functions, for example, a function for receiving an event sent by the application framework layer.

As shown in FIG. 4, the application framework layer may include a window manager, a resource manager, a notification manager, and the like.

The window manager is configured to manage window programs. The window manager may obtain a display size, determine whether there is a status bar, lock a screen, take a screenshot, and the like. The content provider is configured to store and obtain data and make the data accessible to the application. The data may include videos, images, audio, calls that are made and received, browsing history and bookmarks, a phone book, and the like.

The resource manager provides various resources for the application, such as a localized string, an icon, a picture, a layout file, and a video file.

The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen. For example, the status bar shows text information, a prompt tone is made, the electronic device vibrates, and an indicator flickers.

The application framework layer may further include a view system, where the view system includes visual controls, such as a text display control and a picture display control. The view system may be configured to construct an application. A display interface may include one or more views. For example, a display interface including an SMS notification icon may include a text display view and a picture display view.

The phone manager is configured to provide a communication function of the mobile phone 100, for example, call status management (including accepting and declining).

The system layer may include a plurality of function modules, for example, a sensor service module, a physical status recognition module, and a three-dimensional graphics processing library (for example, OpenGL ES).

The sensor service module is configured to monitor sensor data uploaded by various types of sensors at a hardware layer, to determine a physical status of the mobile phone 100.

The physical status recognition module is configured to analyze and recognize a user gesture, a face, and the like.

The three-dimensional graphics processing library is configured to implement three-dimensional graphics drawing, image rendering, composition, layer processing, and the like.

The system layer may further include:

a surface manager, configured to manage a display subsystem and provide fusion of 2D and 3D layers for a plurality of applications.

The media library supports playback and recording in a plurality of commonly used audio and video formats, and static image files. The media library can support a plurality of audio and video coding formats, such as MPEG-4, H.264, MP3, AAC, AMR, JPG, and PNG.

The hardware abstraction layer is a layer between hardware and software. The hardware abstraction layer may include a display driver, a camera driver, a sensor driver, a microphone driver, and the like, and is configured to drive related hardware at the hardware layer, for example, a display, a camera, a sensor, and a microphone. In particular, a microphone module is started by using the microphone driver, to collect target speech information of a user, so as to perform a subsequent speech recognition process.

It should be noted that, the speech recognition method provided in embodiments of this application may be performed at any one of the foregoing layers. This is not limited herein.

According to the speech recognition method in this implementation of this application, a neural network model for simultaneously predicting a character and a punctuation corresponding to a phoneme is constructed, and a training sample set is constructed to train the neural network model, to obtain a trained neural network model. In a training process, word segmentation processing may not need to be performed, a phoneme (vector) converted from a to-be-recognized speech is used as an input of the trained neural network model, forward inference is performed, and a character and a punctuation corresponding to the phoneme may be simultaneously output. In addition, the neural network model is small-sized, and can be deployed on a terminal side.

"Simultaneous", "simultaneous output", and the like described in this specification may be understood as that two types of information (for example, character information corresponding to a phoneme and punctuation information corresponding to the phoneme) can be obtained from an output of the neural network model, instead of only one type of information, and a time sequence of obtaining the two types of information is not limited. In other words, "simultaneous" described in this specification does not limit a same moment in terms of time.

Figure 5A:
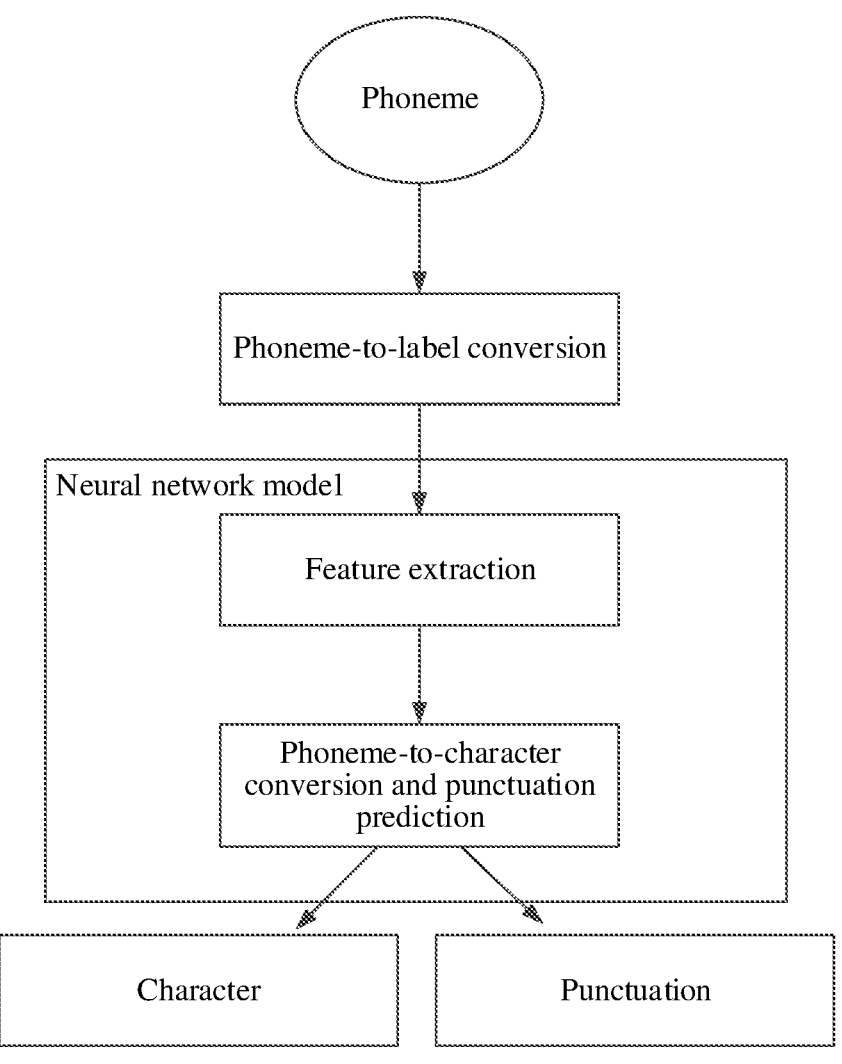
FIG. 5*a* is a block diagram of a neural network model according to an implementation of this application.

FIG. 5a is a block diagram of a neural network model according to an implementation of this application. As shown in FIG. 5a, an input of the neural network model is a label sequence corresponding to a phoneme converted from a to-be-recognized speech, and the neural network model may perform feature extraction on the label sequence. Specifically, feature extraction may be performed on the label sequence by using an embedding layer to obtain a corresponding feature vector, then a character and a punctuation corresponding to the phoneme are predicted based on the feature vector, and the character and the punctuation corresponding to the speech are output at the same time. In an implementation of this application, the neural network model may simultaneously complete a plurality of tasks. Therefore, the neural network model is referred to as a multitask neural network model below.

Specifically, in an implementation of this application, when the neural network model predicts, based on the feature vector, the character and the punctuation corresponding to the phoneme, a classifier may be used to predict a character and a punctuation corresponding to each phoneme, to simultaneously output the character and the punctuation. Moreover, the multitask neural network model that implements character prediction and punctuation prediction simultaneously can be deployed on a terminal side.

In an implementation of this application, the punctuation may include blank, a comma, a period, a question mark, an exclamation mark, and the like. The comma, the period, the question mark, and the exclamation mark may further be divided into two forms: double-byte in Chinese and single-byte in English.

Figure 5B:
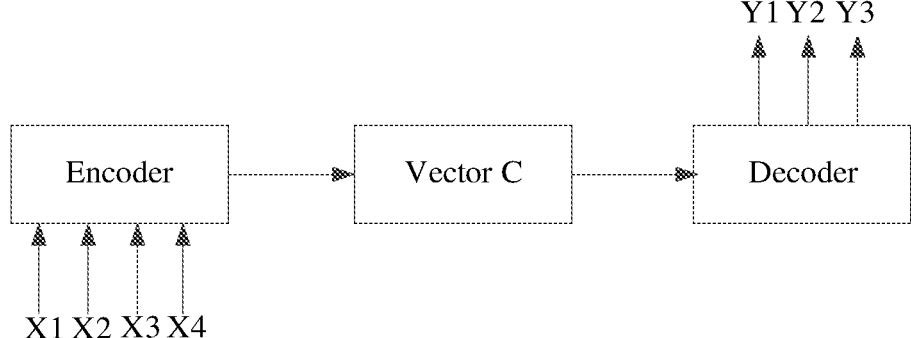
FIG. 5*b* is a schematic diagram of an example encoder-decoder model according to this application.

One Chinese character may have a plurality of types of Pinyin, and an English character corresponds to a plurality of English phonemes. As a result, lengths of a phoneme and a character are inconsistent, and a quantity of punctuations in a sentence may be different from lengths of a character and a phoneme. That is, lengths of an input sequence and an output sequence are inconsistent, and prediction results cannot be simultaneously output in the conventional technology. An encoder-decoder can be used to resolve the inconsistency between the lengths of the input sequence and the output sequence. Although the encoder-decoder can be used to resolve the inconsistency between the lengths of the input sequence and the output sequence, a current output necessarily depends on a previous output. FIG. 5b is a schematic diagram of an example encoder-decoder model according to this application. As shown in FIG. 5b, for example, in the encoder-decoder model, an input sequence of an encoder is "X1X2X3X4", the encoder encodes a vector C and outputs the vector C to a decoder, the decoder performs decoding, and an output sequence "Y1Y2Y3" with a length of 3 is obtained. Before "Y2" is output, "Y1" needs to be first output, and "Y1Y2Y3" cannot be output at the same time. As a result, effect of outputting a recognition result in real time is poor.

Figure 5C:
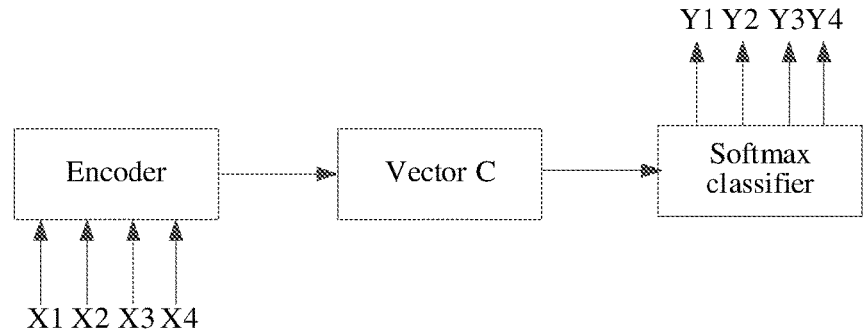
FIG. 5*c* is a schematic diagram of an example encoder model according to this application.

FIG. 5c is a schematic diagram of an example encoder model according to this application. The encoder model shown in FIG. 5c may include an encoder and a Softmax classifier. The encoder model is configured to encode an input sequence to obtain a feature vector C, and the Softmax classifier may obtain an output sequence based on the feature vector C. In the example in FIG. 5c, "Y1Y2Y3Y4" may be output simultaneously based on the input sequence "X1X2X3X4", but this can be applied to only a scenario in which an input sequence and an output sequence have a same length.

An implementation of this application provides a training sample set construction method. In the training sample set construction method in this implementation of this application, a length of a character in a sample statement is aligned with a length of a phonetic-annotated phoneme and a length of a punctuation. In the foregoing neural network structure constructed in the implementation of this application, the encoder model shown in FIG. 5c may be used to implement conversion from a phoneme to a character and a punctuation. Because the encoder model is applicable to a scenario in which an input sequence and an output sequence have a same length, after the neural network model is trained by using a training sample set constructed in this implementation of this application, the neural network model may simultaneously perform conversion from a Chinese/English phoneme to a character and punctuation prediction. In addition, a technical problem that results cannot be output at the same time when input and output lengths are different in the foregoing related technology is resolved.

An implementation of this application further provides a multitask neural network model training method. A training sample in a training sample set is input into a second multitask neural network model for training, to obtain a trained first multitask neural network model. Punctuation prediction and character prediction are integrated into the second multitask neural network model and the first multitask neural network model. When a character is generated in real time, a punctuation is also generated in real time, to implement simultaneous multitask training. In addition, the first multitask neural network model is small-sized, and can be deployed on a terminal side.

The following describes the speech recognition method in this application based on processes of training sample set construction, neural network model training, and neural network model inference. To clearly describe implementations provided in this application, a neural network model existing before training is referred to as a second multitask neural network model, and a neural network model obtained through training is referred to as a first multitask neural network model. The terms "first" and "second" are merely used to distinguish between different features, and do not indicate a specific order or value relationship.

Training Sample Set Construction

Figure 6:
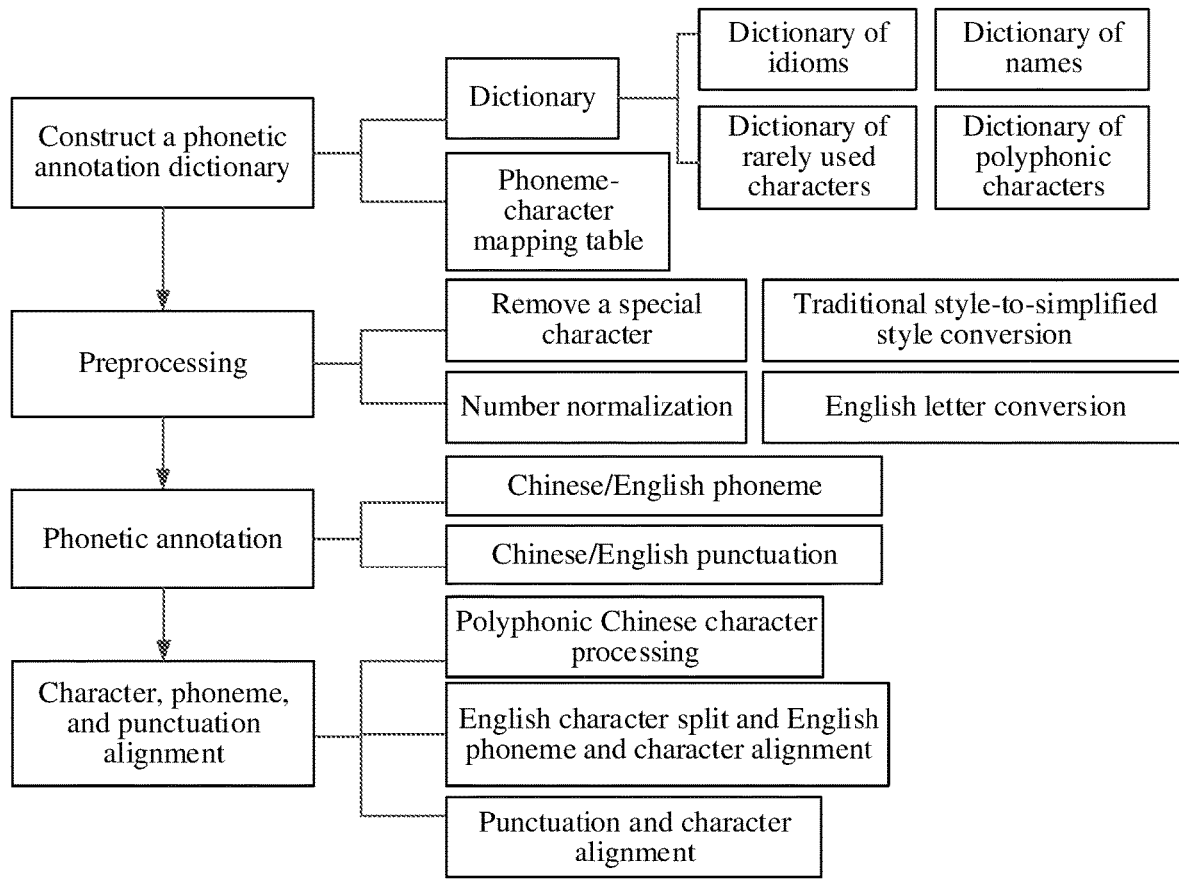
FIG. 6 is a schematic diagram of a process of constructing a training sample set according to an implementation of this application.

FIG. 6 is a schematic diagram of a process of constructing a training sample set according to an implementation of this application. As shown in FIG. 6, a phonetic annotation dictionary may be constructed, and the constructed phonetic annotation dictionary may include a dictionary and a phoneme-character mapping table. The dictionary may include one language or a plurality of languages, for example, may include a Chinese dictionary, an English dictionary, an English-Chinese mixed dictionary, or a mixed dictionary of a plurality of other languages. This is not limited in this application. A dictionary of one language may further include a plurality of different dictionaries. The plurality of different dictionaries may be obtained through classification based on features of the language. For example, a Chinese dictionary may further be subdivided into a dictionary of rarely-used characters, a dictionary of polyphonic characters, a dictionary of idioms, a dictionary of names, and the like. Further subdividing the dictionary based on the features of the language helps improve training effect and improve prediction accuracy.

The phoneme-character mapping table is used to store a correspondence between a character and a corresponding phoneme. One character may be corresponding to one or more phonemes. A processor may perform phonetic annotation on a character based on the phoneme-character mapping table to obtain a phoneme corresponding to the character. For example, for a Chinese character, because there are polyphonic characters, one Chinese character may correspond to one or more phonemes. For an English character, because some English words include a plurality of syllables, one English character may also correspond to one or more phonemes. The processor may search the phoneme-character mapping table based on a character, to determine one or more phonemes corresponding to the character.

A corpus for constructing the training sample set may include a single language, or may be a mixed corpus including a plurality of languages. The processor may perform phonetic annotation on a character in the corpus based on a phonetic annotation dictionary to obtain a phoneme corresponding to the character, and aligning the phoneme corresponding to the character with the character and a punctuation, so that a length of the character and a length of the punctuation are the same as a length of the corresponding phoneme.

In a possible implementation, the processor may perform phonetic annotation on characters in the corpus one by one to obtain phonemes corresponding to the characters, and determine whether a length of the characters is the same as a length of the phonemes corresponding to the characters. If the lengths are different, the processor may align the length of the characters with the length of the phonemes corresponding to the characters. Alternatively, the processor may first perform phonetic annotation on all characters in the corpus to obtain corresponding phonemes, and then align the phonemes corresponding to the characters with the characters. This implementation of this application imposes no limitation on a sequence of performing the phonetic annotation step and the alignment step.

In a possible implementation, alignment processing manners may be different for different languages. For example, for a polyphonic character in Chinese, the processor may select any phoneme from a plurality of phonemes as a phoneme corresponding to the character, that is, a phoneme corresponding to an aligned Chinese polyphonic character is any one of a plurality of phonemes corresponding to the polyphonic character. For an English character, the processor may add an alignment character to the character for alignment. An aligned English character includes the alignment character, and a length of the aligned English character is the same as a length of a phoneme corresponding to the English character. When the alignment character is added to the character, a location of the alignment character may be before or after the character. This is not limited in this application. The alignment character may be any symbol other than an English letter. For example, the alignment character may be "@", "*", "&", "%", or the like.

In a possible implementation, during phonetic annotation, if there is no character in the phonetic annotation dictionary that is the same as the English character in the corpus, the processor may split the English character in the corpus to obtain a plurality of independent sub-characters. If a character that is the same as a sub-character exists in the phonetic annotation dictionary, the processor may perform phonetic annotation and alignment on the sub-character.

In a possible implementation, one character corresponds to one punctuation. In an implementation of this application, in addition to performing alignment on the phoneme and the character, the processor may further perform alignment on the character and the punctuation. As described above, the punctuation may include blank, a comma, a period, a question mark, an exclamation mark, and the like. If there is no punctuation after an original character, a punctuation corresponding to the character may be set to blank. For a character having no punctuation before alignment, an aligned punctuation is blank, so that a length of the punctuation is aligned with a length of the character. In this case, the punctuation corresponding to the character is blank during output. The processor may perform alignment on the character, the phoneme, and the punctuation at the same time or step by step. This is not limited in this application.

In a possible implementation, in the training sample set construction method in this application, lengths of a plurality of different statements that are trained at the same time may be further aligned. For example, when a plurality of statements are trained at the same time, that is, when a batch size is greater than 1, if lengths of the plurality of statements that are trained at the same time are different, "Null" may be added after a character, a phoneme, and a punctuation corresponding to a statement with a shorter length. After "Null" is added after the character, the phoneme, and the punctuation, a length of the statement with the shorter length is the same as a length of a longest statement.

For example, two statements are trained together:

Ni Hao!

Zhen Bu Cuo.

The statement "Ni Hao!" has only two words and is shorter in length, and "Null" may be added after a character, a phoneme, and a punctuation corresponding to the statement. Therefore, in this embodiment, punctuations corresponding to "Ni Hao!" are "[BLANK] ! [Null]"; and punctuations of "Zhen Bu Cuo." are "[BLANK] [BLANK].". This can ensure that the two statements have a same length and can be used for training.

In a possible implementation, before phonetic annotation and alignment are performed on a corpus, preprocessing may be further performed on the corpus. Specific content of the preprocessing may be determined according to a constructed dictionary and a specific language type. For example, if the dictionary does not include a number, preprocessing the corpus may include: converting a number in the corpus into a Chinese character (number normalization shown in FIG. 6). If an English word in the dictionary is uppercase, preprocessing the corpus may further include: converting English in the corpus from lowercase to uppercase (English letter conversion shown in FIG. 6). The preprocessing may further include processing such as conversion from a traditional style to a simplified style and removing a special character. A specific preprocessing manner may be determined based on the phonetic dictionary, a language feature, and the like. The specific preprocessing manner is not limited in this application.

Figure 7:
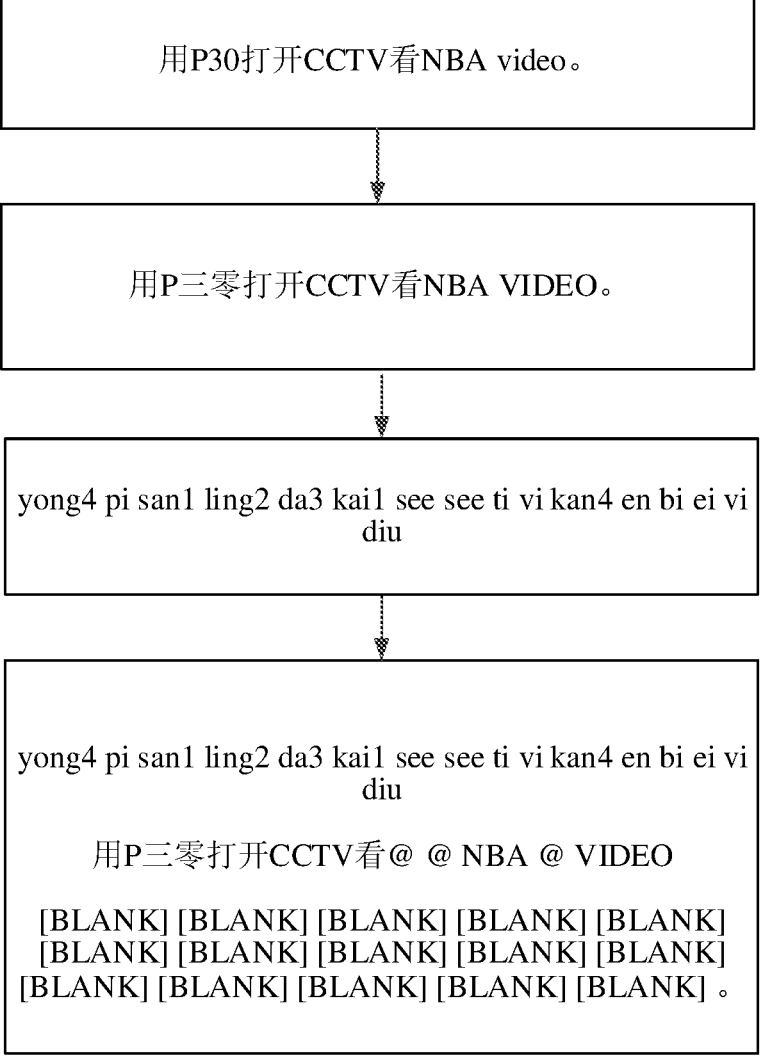
FIG. 7 shows an example of a process of constructing a training sample set according to an embodiment of this application.

FIG. 7 shows an example of a process of constructing a training sample set according to an embodiment of this application. For example, as shown in FIG. 7, a Chinese-English mixed sentence " 用30 打开CTV 看NBA video "。is used as an example. A corpus may be preprocessed first, to convert a number into a Chinese character, and convert English from lowercase to uppercase. In this way, " 用 三零打开CCTV 看NBA VIDEO "。can be obtained.

Phonetic annotation is performed on " 用 三零打开CCTV 看NBA VIDEO "。Chinese is annotated as Pinyin, and English is annotated as a corresponding English phoneme. As shown in FIG. 7, the English character "NBA" corresponds to three phonemes "en bi ei", and the English character "VIDEO" corresponds to two phonemes "vi diu". Because the English character "CCTV" is not in the phonetic annotation dictionary, "CCTV" may be split into four independent sub-characters, and corresponding phonemes "see see ti vi" may be obtained by separately performing phonetic annotation on the sub-characters based on the phonetic annotation dictionary. Finally obtained phonemes may be "yong4 pi san1 ling2 da3 kai1 see see ti vi kan4 en bi ei vi diu".

Alignment: A processor may perform alignment in a phonetic annotation process, or may perform alignment in a unified manner after phonetic annotation. This is not limited in this application. As shown in FIG. 7, an alignment character used in the example of this application may be "@", and "@@ NBA" may be obtaining by performing alignment on the character "NBA", because "NBA" corresponds to three phonemes. The character "VIDEO" corresponds to two phonemes, and therefore the processor may obtain "@ VIDEO" by performing alignment on the character "VIDEO". For a scenario including a Chinese polyphonic character, an example is as follows: "chang2|zhang3 tou2 fa4" may be obtained by performing phonetic annotation on " 长头 发 In this case, the Chinese character " 长 corresponds to two types of Pinyin. For such a Chinese polyphonic character, in an implementation of this application, the processor may randomly select one type of Pinyin as final Chinese Pinyin to implement alignment. A character result obtained after character-phoneme alignment is shown as " 用 三零打开CTV 看@@ NBA @ VIDEO" in the last step in FIG. 7.

In the foregoing example, there is a punctuation mark: a period, at the end of the corpus, and the character "VIDEO" and the phoneme "diu" correspond to the period. For other characters without a punctuation, all punctuations are set to blank. As shown in FIG. 7, there are 15 blanks and one period, and a total of 16 punctuations are aligned with 16 phonemes.

A length of a character, a length of a punctuation, and a length of a phoneme corresponding to the character are aligned, and the first multitask neural network model is obtained by training the second multitask neural network model by using the training sample set constructed in the implementation of this application. In a scenario in which lengths of an input sequence and an output sequence are different, the second neural network model trained through alignment in this application may output prediction results simultaneously based on an input to-be-recognized phoneme, and the prediction results may include a character and a punctuation that are corresponding to the to-be-recognized phoneme. That is, when a character is generated in real time, a punctuation can also be generated in real time. In addition, the first multitask neural network model is small-sized, and can be deployed on a terminal side.

Model Training

FIG. 8 is a flowchart of a multitask neural network model training method according to an implementation of this application. The multitask neural network model training method provided in this implementation of this application may be applied to the apparatus shown in FIG. 2.

In an implementation of this application, before training is performed, a training sample may be selected from a training sample set as an input of a multitask neural network. A size of the training sample may be represented as (B, U), where B may represent a quantity of samples in one training, and U may represent a length of a phoneme corresponding to a sample with a longest length in the training samples. For example, B may be 128, indicating that a quantity of samples in one training is phonemes corresponding to 128 sentences, and a length of a phoneme corresponding to a longest sentence in the 128 sentences is U.

It should be noted that, a plurality of batches of training samples may be selected and input into a second multitask neural network model for training. A larger amount of training data indicates higher accuracy of a character and a punctuation predicted when an obtained first multitask neural network model performs inference.

An input of the neural network model needs to be a value rather than a character string. Therefore, before training, the training sample may be converted into data represented by a value. In an implementation of this application, a value corresponding to each phoneme in a dictionary may be preset as a label of the phoneme. Before training is performed, a corresponding label may be searched for based on a phoneme, to convert the training sample into a label sequence, that is, a vector represented by a value, as input data of a neural network, to train the neural network.

For example, one training sample (jin1 tian1 tian1 qi4 bu2 cuo4) is used as an example, an input is (1, 6), and (10, 148, 148, 2456, 30, 40) may be obtained by converting the training sample into a label sequence. That is, each phoneme has a corresponding label, and the label corresponding to the phoneme may be a number. Through conversion from a sample sequence to a label sequence, the sample sequence may be converted into a vector representation form to participate in a subsequent calculation process.

As shown in FIG. 8, the multitask neural network model training method provided in this application may include the following steps.

Step S801: Input input data into a second multitask neural network model, and determine a character probability matrix and a punctuation probability matrix that correspond to the input data.

Step S802: Separately calculate a character cross entropy loss and a punctuation cross entropy loss based on the character probability matrix and the punctuation probability matrix.

Step S803: Calculate a weighted cross entropy loss based on the character cross entropy loss and the punctuation cross entropy loss.

Step S804: Adjust a parameter of the second multitask neural network model based on the weighted cross entropy loss, to obtain a trained first multitask neural network model.

In step S801, the input data may be a label sequence obtained through phoneme conversion, that is, a vector corresponding to a to-be-recognized phoneme.

In a possible implementation, in step S801, a training apparatus may perform an operation on the input data by using the second multitask neural network model, to obtain a feature vector of the input data. Then, the training apparatus may perform an operation on the feature vector by using the second multitask neural network model, and predict a character and a punctuation that correspond to a training sample, to obtain the character probability matrix and the punctuation probability matrix. The input data may be the foregoing training sample.

In another possible implementation, the second multitask neural network model may include the encoder in the encoder model shown in FIG. 5c. The encoder is configured to perform feature extraction on the to-be-recognized phoneme (input data) to obtain the feature vector.

For example, the encoder may include an embedding layer, and the training apparatus may perform an operation on the input data by using the embedding layer to extract the feature vector. Specifically, the training apparatus may perform an operation according to a coding scheme specifically used by the embedding layer and the input data, to obtain the feature vector, for example, the vector C shown in FIG. 5c.

In a possible implementation, each phoneme may be represented by using one one-dimensional vector after encoding, and a length of the vector may be determined based on a quantity of phonemes in a dictionary. For example, in an example of this application, 512 pieces of data may be used to represent one phoneme. In an implementation of this application, a correspondence between a label corresponding to a phoneme and a vector corresponding to the phoneme after encoding may be recorded.

The foregoing example is still used. A dimension of the input data is (1, 6), that is, a label obtained by converting six phonemes. After processing by the encoder, an obtained feature vector may be (1, 6, 512).

In a possible implementation, the second multitask neural network model may further include a classifier (for example, the Softmax classifier shown in FIG. 5c), and the training apparatus may classify the feature vector by using the classifier in the second multitask neural network model, to obtain the character probability matrix and the punctuation probability matrix. The character probability matrix represents a first probability of a character corresponding to a phoneme, and the punctuation probability matrix represents a second probability of a punctuation corresponding to each phoneme. Based on the character probability matrix and the punctuation probability matrix, the character and the punctuation corresponding to the phoneme can be obtained. In a possible implementation, a correspondence between a character and a first index corresponding to the character and a correspondence between a punctuation and a second index corresponding to the punctuation may be established in advance, to form a vocabulary. In this way, when the second multitask neural network model is trained, or when inference is performed by using the first multitask neural network model, the neural network model may obtain, based on the obtained character probability matrix, punctuation probability matrix, and vocabulary, the character and the punctuation corresponding to the phoneme.

Specifically, a first index of a character corresponding to a highest first probability may be obtained by using the character probability matrix, and the character corresponding to the phoneme may be obtained based on the first index and the vocabulary. A second index of a punctuation corresponding to a highest second probability may be obtained by using the punctuation probability matrix, and the punctuation corresponding to the phoneme may be obtained based on the second index and the vocabulary. In other words, the character probability matrix corresponding to the to-be-recognized phoneme (input data) is obtained by using the Softmax classifier, the first probability in the matrix indicates a probability that the character corresponding to the phoneme is a character corresponding to the first probability, and the character corresponding to the highest first probability may be determined as the character corresponding to the phoneme. The punctuation corresponding to the phoneme may be determined in the same manner.

In a possible implementation, in step S802, the training apparatus may calculate the character cross entropy loss based on a cross entropy loss function and the character probability matrix. A specific calculation formula is as follows:

$$y(C) = -\sum_{i=1}^{n} P(c_i)\log(P(c_i)) \ (C = (c_1, c_2, c_3 \ \ldots \ , c_n))$$

Herein, y(C) represents a cross entropy loss of all characters, $P(c_i)$ may represent a first probability corresponding to a character $c_i$, i represents a subscript of the character, a value range of i is 1 to n, and n is a positive integer. The character cross entropy loss may be calculated according to the foregoing formula and the character probability matrix.

Similarly, in step S802, the training apparatus may calculate the punctuation cross loss based on a cross entropy loss function and the punctuation probability matrix. A specific calculation formula is as follows:

$$y(P) = -\sum_{i=1}^{n} P(p_i)\log(P(p_i)) \ (P = (p_1, p_2, p_3 \ \ldots \ , p_n))$$

Herein, y(P) represents a cross entropy loss of all punctuations, and $P(p_i)$ may represent a second probability corresponding to a punctuation $p_i$. The punctuation cross entropy loss may be calculated according to the foregoing formula and the punctuation probability matrix.

In a possible implementation, a first weight corresponding to a character cross loss and a second weight corresponding to a punctuation cross loss may be set based on different requirements for character prediction accuracy and punctuation prediction accuracy. In step S803, the weighted cross entropy loss may be calculated based on the character cross entropy loss, the first weight, the punctuation cross entropy loss, and the second weight. The cross entropy loss may be calculated according to the following formula:

$$y(C+P)=w1 \times y(C)+w2 \times y(P)$$

Herein, y(C+P) may represent the weighted cross entropy loss of the character and the punctuation, w1 may represent the first weight, and w2 may represent the second weight. In a possible implementation, a sum of the first weight and the second weight is 1, that is, w2=1−w1. For example, if the first weight is 0.7, the second weight may be 0.3.

It should be noted that, the foregoing setting manners and examples of the first weight and the second weight are merely some examples of this application, and are not intended to limit this application in any manner.

After the weighted cross entropy loss is obtained, in step S804, the training apparatus may update a weight of the second multitask neural network model based on the weighted cross entropy by using a backpropagation algorithm, to obtain the trained first multitask neural network model. In a possible implementation, an Adam optimizer may be used to implement weight update.

According to the multitask neural network model training method in this application, simultaneous training for both character prediction and punctuation prediction tasks can be implemented. In addition, because a constructed training sample set includes a plurality of languages, the multitask neural network model training method in this application may further implement training for a recognition (prediction) task for the plurality of languages. A multitask neural network model trained according to the multitask neural network model training method in this implementation of this application can simultaneously perform prediction for a plurality of languages and punctuations. In addition, compared with a conventional acoustic model, the multitask neural network model is small-sized, and can be deployed on a terminal side.

Model Inference

After a second multitask neural network model is trained to obtain a first multitask neural network model, a to-berecognized phoneme may be input into the first multitask neural network model, and forward inference is performed to implement simultaneous prediction and output of a character and a punctuation corresponding to the phoneme.

Therefore, this application further provides a speech recognition method, which may be applied to the terminal device shown in FIG. 1 or FIG. 3. After the first multitask neural network model is obtained, the first multitask neural network model may be deployed in the terminal device.

FIG. 9*a* is a schematic diagram of an application scenario in which speech recognition is performed on a terminal device side according to an implementation of this application. As shown in FIG. 9*a*, an acoustic model and a neural network model (the first multitask neural network model) may be deployed in the terminal device. The terminal device may input a collected speech signal or a received speech signal into the acoustic model, and process the speech signal by using the acoustic model to obtain a phoneme corresponding to the speech signal and output the phoneme to the first multitask neural network model.

Figure 10:
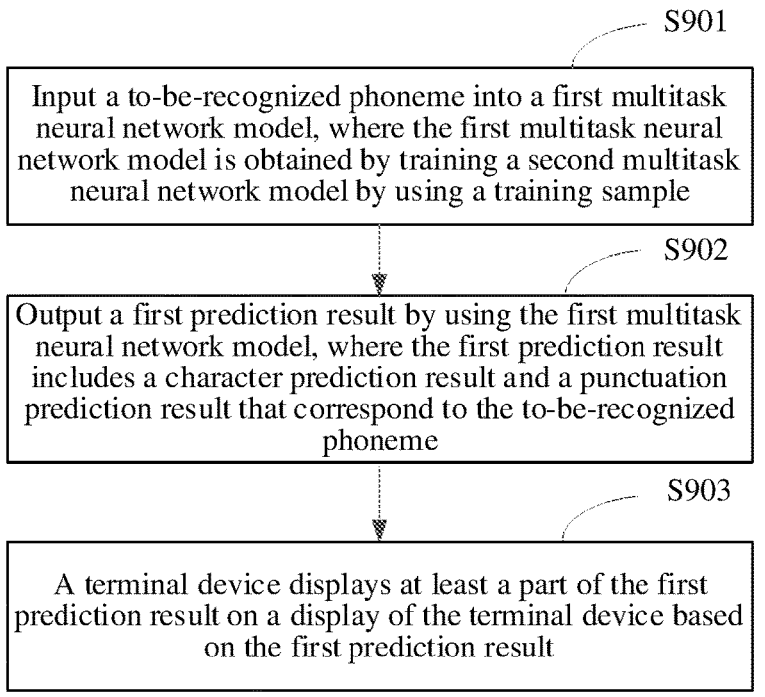
FIG. 10 is a flowchart of a speech recognition method according to an implementation of this application.

FIG. 10 is a flowchart of a speech recognition method according to an implementation of this application. As shown in FIG. 10, the speech recognition method provided in this implementation of this application may include the following steps.

Step S901: Input a to-be-recognized phoneme into a first multitask neural network model, where the first multitask neural network model is obtained by training a second multitask neural network model by using a training sample.

The training sample includes a sample statement, the sample statement includes a character, and the training sample includes a phoneme and a punctuation that correspond to the character in the sample statement. In a possible implementation, lengths of the phoneme, the character, and the punctuation are the same.

Both the second multitask neural network model and the first multitask neural network model can output a first prediction result and display at least a part of the first prediction result, and the first prediction result includes a character prediction result and a punctuation prediction result. In other words, the second multitask neural network model and the first multitask neural network model can simultaneously predict, based on the to-be-recognized phoneme, a character and a punctuation corresponding to the to-be-recognized phoneme.

For a process of constructing the training sample and training the second multitask neural network model based on the training sample to obtain the first multitask neural network model, refer to the foregoing description. Details are not described again.

As shown in FIG. 9*a*, the to-be-recognized phoneme may be obtained by processing a to-be-recognized speech signal by using the acoustic model. The to-be-recognized speech signal may be a signal collected by a terminal device or a signal received by a terminal device. This is not limited in this application.

For example, in an example, the terminal device opens a social app, detects that a microphone is turned on, and collects a speech signal. If the terminal device detects a conversion request that requests to convert the speech signal into a text, the terminal device may input the speech signal into the acoustic model. In another example, the terminal device opens a social app, and receives a speech signal sent by another terminal device, and the terminal device detects a conversion request. In this case, the terminal device may input the speech signal into the acoustic model. After receiving the speech signal, the acoustic model may process the speech signal to obtain a to-be-recognized phoneme. The terminal device may input the to-be-recognized phoneme into the first multitask neural network model.

In an implementation of this application, the to-be-recognized phoneme output by the acoustic model may be a label sequence corresponding to the phoneme.

As shown in FIG. 10, the speech recognition method in this implementation of this application may further include the following steps.

Step S902: The terminal device outputs a first prediction result by using the first multitask neural network model, where the first prediction result includes a character prediction result and a punctuation prediction result that correspond to the to-be-recognized phoneme.

Step S903: The terminal device displays at least a part of the first prediction result on a display of the terminal device based on the first prediction result.

It can be learned from the block diagram of the neural network model shown in FIG. 5*a* that the first multitask neural network model may perform feature extraction to extract a feature vector of to-be-recognized phoneme, and then a classifier performs classification based on the feature vector, to predict a character and a punctuation corresponding to each to-be-recognized phoneme. For example, the classifier may perform classification based on the input to-be-recognized phoneme, to obtain the corresponding character and punctuation, and output a prediction result (the first prediction result). After the first multitask neural network model outputs the first prediction result, the terminal device may simultaneously display the predicted character and punctuation. Alternatively, the first multitask neural network model may process the input to-be-recognized phoneme by using the encoder model shown in FIG. 5*c*, to obtain the corresponding character and punctuation for simultaneous output.

Figure 9B:
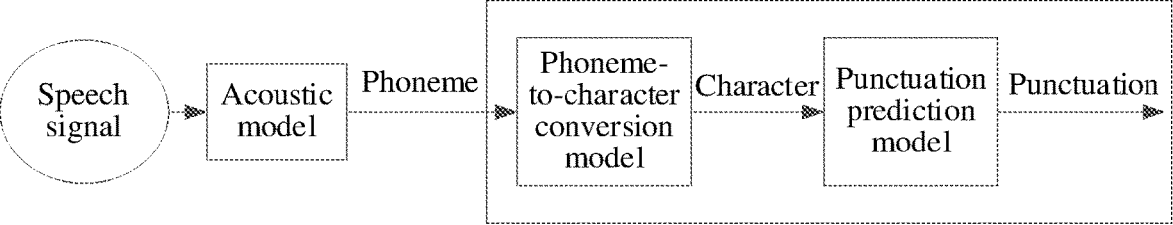
FIG. 9*b* is a schematic diagram of a speech recognition process in the conventional technology according to an example of this application.

FIG. 9*b* is a schematic diagram of a speech recognition process in the conventional technology according to an example of this application. As shown in FIG. 9*b*, in a conventional method for converting a phoneme into a character and a punctuation, a phoneme may be first mapped to a character, and then a corresponding punctuation is obtained through prediction. In an example, the phoneme may be first mapped to the character by using an N-Gram language model, and then the punctuation is obtained by using a punctuation prediction model after the character is obtained. Two models are required to predict the character and the punctuation respectively, and the character and the punctuation cannot be output at the same time. In addition, the model is large and cannot be deployed on a terminal side. However, in the speech recognition method used in this application, a character and a punctuation can be simultaneously output by using one neural network model shown in FIG. 9*a*, and the model can be deployed on a terminal side because the model is simple.

According to the speech recognition method provided in this implementation of this application, character prediction and punctuation prediction are integrated into a neural network model, the neural network model is trained by using a specially constructed training sample set, and a multitask neural network model obtained through training is deployed on a terminal side. In this way, a predicted character and punctuation can be simultaneously output and displayed.

In a possible implementation, the first multitask neural network model may be a streaming network structure, and that a terminal device inputs a to-be-recognized phoneme into a first multitask neural network model, and outputs a first prediction result by using the first multitask neural network model may include: cyclically inputting, by the terminal device, the to-be-recognized phoneme into the first multitask neural network model, and outputting the first prediction result based on a length of a currently input to-be-recognized phoneme by using the first multitask neural network model.

In a possible implementation, the cyclically inputting, by the terminal device, the to-be-recognized phoneme into the first multitask neural network model, and outputting the first prediction result based on a length of a currently input to-be-recognized phoneme by using the first multitask neural network model may include:

before input of all to-be-recognized phonemes into the first multitask neural network model is completed, if the length of the currently input phoneme is less than a receptive field, continuing, by the terminal device, to input a next phoneme; or before input of all to-be-recognized phonemes into the first multitask neural network model is completed, if the length of the currently input phoneme is not less than a receptive field, obtaining, by the terminal device, a second prediction result of a first phoneme in the currently input phoneme based on a character and a punctuation of the currently input phoneme, and storing the second prediction result; and continuing, by the terminal device, to input a feature vector of the first phoneme, a phoneme other than the first phoneme in the currently input phoneme, and a next phoneme in the to-be-recognized phonemes into the first multitask neural network model;

when the input of all the to-be-recognized phonemes into the first multitask neural network model is completed, obtaining, by the terminal device, a second prediction result of the currently input phoneme based on the character and the punctuation of the currently input phoneme; and if there is no stored second prediction result, using, by the terminal device, the second prediction result of the currently input phoneme as the first prediction result of the to-be-recognized phoneme; or if there is a stored second prediction result, obtaining the first prediction result of the to-be-recognized phoneme based on the second prediction result of the currently input phoneme and the stored second prediction result.

Figure 11:
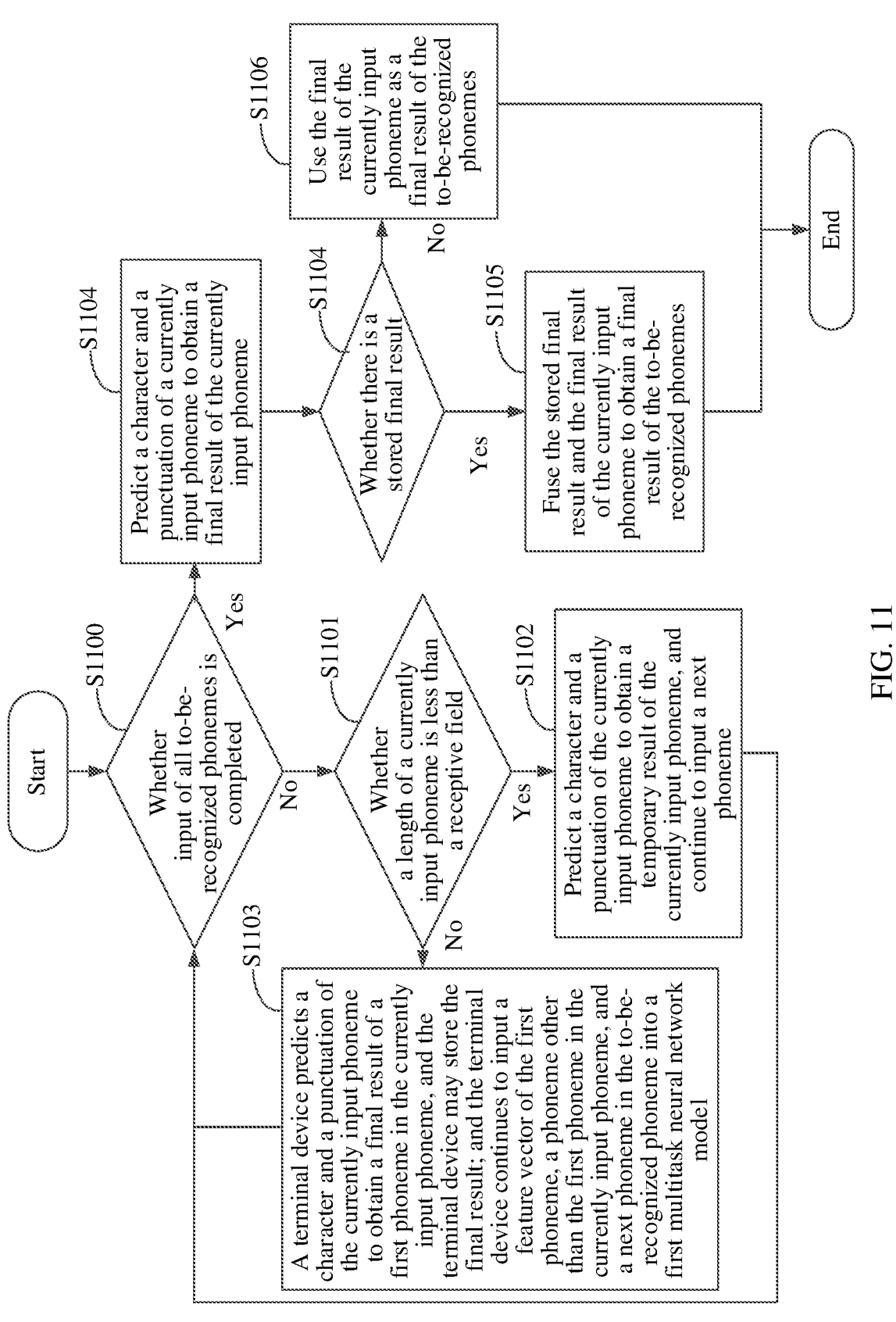
FIG. 11 is a flowchart of a speech recognition method according to an implementation of this application.

The second prediction result is a final result of one or more to-be-recognized phonemes, and a prediction result of the phoneme other than the first phoneme in the currently input phoneme is a temporary prediction result. Therefore, the terminal device stores the second prediction result. Finally, all second prediction results are fused to obtain the first prediction result (a final result of all the to-be-recognized phonemes). FIG. 11 is a flowchart of a speech recognition method according to an implementation of this application. As shown in FIG. 11, in the speech recognition method in this implementation of this application, a to-be-recognized phoneme may be cyclically input into a first multitask neural network model based on a relationship between a length of the to-be-recognized phoneme and a receptive field of the first multitask neural network model, to perform character and punctuation prediction. Specifically, the following process may be included.

Step S1100: Determine whether input of all to-be-recognized phonemes is completed. If the input of all the to-be-recognized phonemes is not completed, step S1101 is performed. If the input of all the to-be-recognized phonemes is completed, step S1104 is performed.

Step S1101: Determine whether a length of a currently input phoneme is less than a receptive field. If the length of the currently input phoneme is less than the receptive field, step S1102 is performed. If the length of the currently input phoneme is not less than the receptive field, step S1103 is performed.

Step S1102: Predict a character and a punctuation of the currently input phoneme to obtain a temporary result of the currently input phoneme, continue to input a next phoneme, and return to step S1100.

Step S1103: Predict a character and a punctuation of the currently input phoneme to obtain a final result of a first phoneme in the currently input phoneme. A terminal device may store the final result. The terminal device continues to input a feature vector of the first phoneme, a phoneme other than the first phoneme in the currently input phoneme, and a next phoneme in the to-be-recognized phonemes into the first multitask neural network model; and returns to step S1100.

Step S1104: Predict a character and a punctuation of the currently input phoneme to obtain a final result of the currently input phoneme, and determine whether there is a stored final result. If there is a stored final result, step S1105 is performed. If there is no stored final result, step S1106 is performed.

Step S1105: Fuse the stored final result and the final result of the currently input phoneme to obtain a final result of the to-be-recognized phoneme, and end the loop.

Step S1106: Use the final result of the currently input phoneme as a final result of the to-be-recognized phoneme, and end the loop.

In step S1100, the terminal device may determine, based on an output of a previously connected acoustic model, whether the input of all the to-be-recognized phonemes is completed. If the acoustic model does not output a new phoneme, the terminal device may determine that all the phonemes have been input into the first multitask neural network model. If the acoustic model outputs a new phoneme, the terminal device may determine that the input of all the to-be-recognized phonemes is not completed.

In a possible implementation, a VAD (voice activity detection) may be further disposed on the terminal device, and the VAD may detect when there is a human voice and when the human voice ends in a segment of audio. After it is detected that the human voice in the audio ends, the acoustic model may be controlled to stop outputting.

The length of the currently input phoneme is 1 at the beginning of the input. As more phonemes are gradually input, the length of the currently input phoneme gradually increases. If a length of all the to-be-recognized phonemes is greater than or equal to the receptive field, the length of the currently input phoneme no longer changes when being increased to a same size as the receptive field. If there is a new input phoneme, the first phoneme in the currently input phoneme is no longer input into the first multitask neural network model. If a length of all the to-be-recognized phonemes is less than the receptive field, a maximum value of the length of the currently input phoneme is less than the receptive field.

For example, it is assumed that the receptive field of the first multitask neural network model is 8, and the length of the to-be-recognized phoneme is 15. When first seven to-be-recognized phonemes are input, lengths of the currently input phonemes are respectively 1, 2, 3, 4, 5, 6, and 7, and the lengths of the currently input phonemes are less than the receptive field. Starting from input of the eighth to-be-recognized phoneme, a length of the currently input phonemes is 8, which is not less than the receptive field. When the ninth to-be-recognized phoneme is input, a length of the currently input phonemes is still 8, and the currently input phonemes are respectively 2, 3, 4, 5, 6, 7, 8, and 9. The same applies to the tenth to-be-recognized phoneme and a subsequent to-be-recognized phoneme. If the receptive field of the first multitask neural network model is 8, and the length of the to-be-recognized phoneme is 7, a maximum length of the currently input phoneme is 7, which is less than the receptive field.

If determining that the length of the currently input phoneme is less than the receptive field, the terminal device may perform step S1102 to predict the character and the punctuation of the currently input phoneme to obtain the temporary result of the currently input phoneme. If the length of the currently input phoneme is less than the receptive field, it indicates that the character and the punctuation obtained by predicting the currently input phoneme may change based on a subsequent input phoneme. Therefore, when the length of the currently input phoneme is less than the receptive field, the terminal device may use a prediction result of the currently input phoneme as a temporary result. The terminal device may input a next to-be-recognized phoneme predicted by the acoustic model into the first multitask neural network model, and then return to step S1100 to continue to determine whether the input of all the to-be-recognized phonemes is completed.

For example, the foregoing example is still used. Currently input phonemes are a total of five phonemes: the first phoneme, the second phoneme, the third phoneme, the fourth phoneme, and the fifth phoneme, and a length of the currently input phonemes is 5, which is less than the receptive field 8. Therefore, the terminal device may use prediction results of characters and punctuations of the first phoneme, the second phoneme, the third phoneme, the fourth phoneme, and the fifth phoneme as temporary results, and input a next (sixth) to-be-recognized phoneme. That is, currently input phonemes are a total of six phonemes: the first phoneme, the second phoneme, the third phoneme, the fourth phoneme, the fifth phoneme, and the sixth phoneme.

If determining that the length of the currently input phoneme is not less than the receptive field, the terminal device may perform step S1103 to predict the character and the punctuation of the currently input phoneme to obtain the final result of the first phoneme in the currently input phoneme. The terminal device may store the final result. A prediction result of the terminal device for the phoneme other than the first phoneme in the currently input phoneme is a temporary result. The terminal device may continue to input the feature vector of the first phoneme extracted in the current prediction process, the phoneme other than the first phoneme in the currently input phoneme, and the next phoneme in the to-be-recognized phonemes into the first multitask neural network model. Then, the process returns to step S1100, to continue to determine whether the input of all the to-be-recognized phonemes is completed.

For example, the foregoing example is still used. Currently input phonemes are the first phoneme to the eighth phoneme, and a length of the currently input phonemes is 8, which is equal to the receptive field 8, that is, not less than the receptive field 8. Therefore, the terminal device may use a prediction result of the first phoneme as a final result, and store the final result. The terminal device may use a prediction result of the second to eighth phonemes as a temporary result. The terminal device may input a feature vector of the first phoneme extracted in the current prediction process, the second to eighth phonemes, and the ninth phoneme into the first multitask neural network model. Inference is continued to obtain a prediction result of the second phoneme (the first phoneme in the currently input phonemes) as a final result, and the final result is stored. The terminal device may input a feature vector of the second phoneme extracted in the current prediction process, the third to ninth phonemes, and the tenth phoneme into the first multitask neural network model, continue inference, . . . , and repeat the foregoing process, until the input of all the to-be-recognized phonemes is completed.

For step S1103, when the input of the first multitask neural network model is a feature vector of the currently input phoneme and a feature vector of a first phoneme in a previously input phoneme, the feature vector of the currently input phoneme may be extracted, and a concatenation operation is performed on the feature vector of the currently input phoneme and the feature vector of the first phoneme in the previously input phoneme. For a feature vector obtained through concatenation, the terminal device may perform a convolution operation to further extract the feature vector, and predict a result based on the extracted feature vector. For example, currently input phonemes are feature vectors of the second to ninth phonemes and the first phoneme. When performing prediction, the terminal device may extract the feature vectors of the second to ninth phonemes, and perform a concatenation operation (concat) on the feature vector of the first phoneme and the feature vectors of the second to ninth phonemes. For a feature vector obtained through concatenation, the terminal device may perform a convolution operation to further extract the feature vector, and predict a result based on the extracted feature vector. The terminal device may further perform a cut operation on the feature vector obtained through concatenation, to cut out the feature vector corresponding to the second phoneme as an input of next prediction.

Returning to step S1100, if the input of all the to-be-recognized phonemes is completed, the terminal device may perform step S1104 to predict the character and the punctuation of the currently input phoneme to obtain the final result of the currently input phoneme. In this case, the terminal device may determine whether there is a stored final result. A reason is as follows: If the length of all the to-be-recognized phonemes is not less than the receptive field, the terminal device has stored final results of a previous part of phonemes. If the length of all the to-be-recognized phonemes is less than the receptive field, the terminal device has not stored a final result.

If the terminal device determines that there is a stored final result, the terminal device may perform step S1105 to fuse the stored final result and the final result of the currently input phoneme to obtain the final result of the to-be-recognized phoneme, and end the loop. A specific fusion manner may be concatenating the final result of the currently input phoneme and the stored final result to obtain the final result of the to-be-recognized phoneme. If the terminal device determines that no final result is stored, the terminal device may perform step S1106 to use the final result of the currently input phoneme as the final result of the to-be-recognized phoneme, and end the loop.

For example, the foregoing example is still used. Currently input phonemes are feature vectors of the eighth phoneme, the ninth phoneme, the tenth phoneme, the eleventh phoneme, the twelfth phoneme, the thirteenth phoneme, the fourteenth phoneme, the fifteenth phoneme, and the seventh phoneme. The terminal device may determine that the input of all the to-be-recognized phonemes is completed, and perform step S1104 to predict characters and punctuations of the eighth to fifteenth phonemes, to obtain a final result of the eighth to fifteenth phonemes. The terminal device may determine that a final result of the first to seventh phonemes has been stored. Therefore, the terminal device may fuse the final result of the first to seventh phonemes and the final result of the eighth to fifteenth phonemes to obtain a final result of the first to fifteenth phonemes.

According to the speech recognition method in the foregoing implementation of this application, the to-be-recognized phoneme output by an acoustic model is cyclically input into the first multitask neural network model with a streaming network structure, so that a prediction result of the to-be-recognized phoneme refers to both a previous phoneme and a subsequent phoneme, and prediction accuracy is improved.

In addition, a streaming network structure is used, and a previous input is input into the network as a buffer. This reduces calculation workload of the model and implements quick inference. Specifically, a CNN (convolutional neural network) has a receptive field. For example, it is assumed that there are seven convolutional layers in total, a real receptive field is 15, the receptive field uses a central location as a reference, and each of the left and right sides needs seven phonemes. The streaming network structure buffers all seven historical features through a buffer at each layer. Therefore, eight phonemes are calculated each time, and an actual receptive field is 8, which can reduce calculation workload compared with the receptive field 15.

In addition, punctuation prediction and character prediction are integrated into a model. This can ensure that a punctuation is generated in real time when a character is generated in real time, punctuation prediction can be performed without waiting for the end of all speech recognition results, and the character and the punctuation can be output at the same time. Moreover, the multitask neural network model is smaller than the conventional acoustic model, and can be deployed on a terminal side.

The following further describes the speech recognition method in this application with reference to a specific application example.

For example, "chun1 mian2 bu4 jue2 xiao3 chu4 chu4 wen2 ti2 niao3" is input. During cyclic input, 'chun1' is first input into a neural network model, a length of the currently input phoneme is 1, which is less than a receptive field 8, and a temporary result ' 春 ' is obtained through prediction. 'chun1 mian2' is input into the neural network model, a length of the currently input phonemes is 2, which is less than the receptive field 8, and a temporary result ' 春眠 ' is obtained through prediction. 'chun1 mian2 bu4 jue2 xiao3' is input into the neural network model, a length of the currently input phonemes is 5, which is less than the receptive field 8, and a temporary result ' 春眠不觉晓 ' is obtained through prediction.

Because the receptive field of the model is 8, a result obtained when the receptive field is not satisfied is a temporary result. When an input satisfies (is not less than) the receptive field, that is, when 'chun1 mian2 bu4 jue2 xiao3 chu4 chu4 wen2' is input into the neural network model, a length of the currently input phonemes is 8, which is equal to the receptive field 8, and ' 春眠不觉晓 处处闻 ' is output. In this case, a result obtained by predicting the first input phoneme 'chun1' is a final result, and a character and a punctuation corresponding to the phoneme 'chun1' are stored as a final result.

During next inference, a feature vector of the phoneme 'chun1' is input into the neural network model as a buffer. When 'mian2 bu4 jue2 xiao3 chu4 chu4 wen2 ti2' is input into the neural network model, a length of the currently input phonemes is 8, which is equal to the receptive field 8, and ' 眠不觉晓 处处闻啼 ' is output. In this case, a character and a punctuation obtained by predicting the first input phoneme 'mian2' are stored as a final result.

A feature vector of the phoneme 'mian' is input into the neural network model as a buffer, currently input phonemes are 'bu4 jue2 xiao3 chu4 chu4 wen2 ti2 niao3', and ' 不觉晓 处处闻啼鸟 ' is obtained through prediction. Because no phoneme is generated at this time, characters and punctuations obtained by predicting the currently input phonemes are a final result, and are fused with a previously stored result to obtain a final output " 春眠不觉晓 处处闻啼鸟 。"

In a possible implementation, the terminal device may store the predicted temporary result in a buffer, and the terminal device may preset a quantity (a preset quantity) of temporary buffers for storage. A value of the preset quantity may be the same as that of the receptive field. In this way, the terminal device may determine, by determining whether the buffers of the preset quantity are full, whether the length of the currently input phoneme is less than the receptive field. If the buffers of the preset quantity are not full, the length of the currently input phoneme is less than the receptive field. If the buffers of the preset quantity are full, the length of the currently input phoneme is not less than the receptive field. In this implementation, a process of determining whether the length of the currently input phoneme is less than the receptive field may be performed after the prediction result is obtained by predicting the currently input phoneme.

Figure 12:
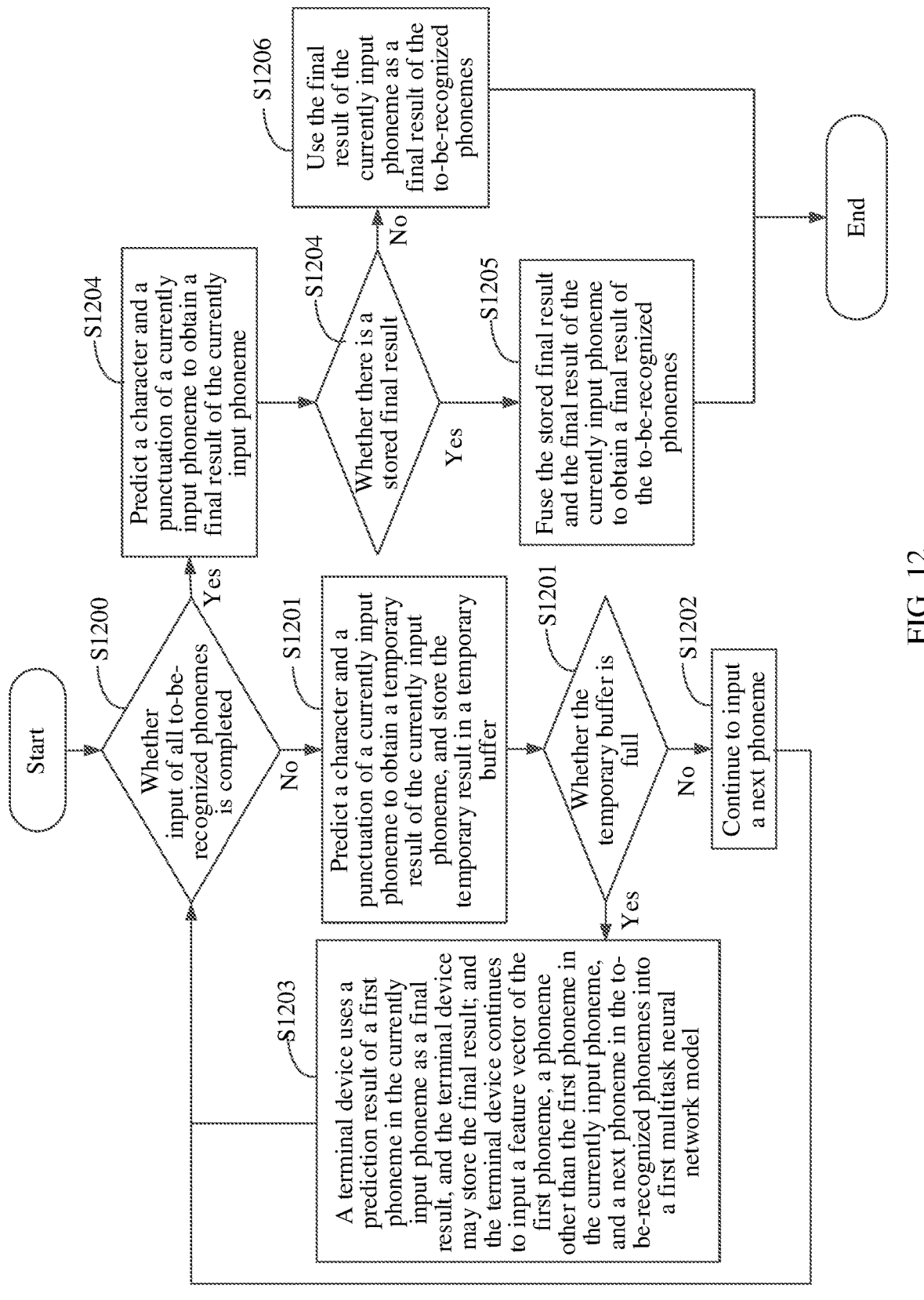
FIG. 12 is a flowchart of a speech recognition method according to an implementation of this application.

FIG. 12 is a flowchart of a speech recognition method according to an implementation of this application. The speech recognition method in this implementation may include the following steps.

Step S1200: Determine whether input of all to-be-recognized phonemes is completed. If the input of all the to-be-recognized phonemes is not completed, step S1201 is performed. If the input of all the to-be-recognized phonemes is completed, step S1204 is performed.

Step S1201: Predict a character and a punctuation of a currently input phoneme to obtain a temporary result of the currently input phoneme, store the temporary result in a temporary buffer, and determine whether the temporary buffer is full. If the temporary buffer is not full, step S1202 is performed. If the temporary buffer is full, step S1203 is performed.

Step S1202: Continue to input a next phoneme, and return to step S1200.

Step S1203: Use a prediction result of a first phoneme in the currently input phoneme as a final result. A terminal device may store the final result. The terminal device continues to input a feature vector of the first phoneme, a phoneme other than the first phoneme in the currently input phoneme, and a next phoneme in the to-be-recognized phonemes into the first multitask neural network model; and returns to step S1200.

Step S1204: Predict a character and a punctuation of the currently input phoneme to obtain a final result of the currently input phoneme, and determine whether there is a stored final result. If there is a stored final result, step S1205 is performed. If there is no stored final result, step S1206 is performed.

Step S1205: Fuse the stored final result and the final result of the currently input phoneme to obtain a final result of the to-be-recognized phoneme, and end the loop.

Step S1206: Use the final result of the currently input phoneme as a final result of the to-be-recognized phoneme, and end the loop.

In the foregoing implementation, steps S1201 to S1203 are different from steps S1101 to S1103 in an order of determining whether a receptive field is satisfied and a prediction order. For other content, refer to the explanation in FIG. 11.

In another possible implementation, the first multitask neural network model may alternatively be a non-streaming network structure. The terminal device may sequentially input to-be-recognized phonemes, and does not cyclically input a phoneme for which a result has been predicted. Compared with a streaming network structure, the non-streaming network structure does not need to buffer a predicted historical result, so that occupied memory space is reduced. This can further reduce a size of the neural network model.

For the non-streaming network structure, outputting a first prediction result by using the first multitask neural network model may include: outputting the first prediction result based on a relationship between a total length of the to-be-recognized phoneme and a phoneme length threshold by using the first multitask neural network model. Specifically, the following steps may be included.

1. If the total length of the to-be-recognized phoneme is less than the phoneme length threshold, the first prediction result is output based on all to-be-recognized phonemes by using the first multitask neural network model.

2. If the total length of the to-be-recognized phoneme is not less than the phoneme length threshold, before input of all the to-be-recognized phonemes into the first multitask neural network model is completed: 2.1. If a length of a currently input phoneme is less than the phoneme length threshold, the terminal device continues to input a next phoneme. 2.2. If a length of a currently input phoneme is not less than the phoneme length threshold, the terminal device obtains a second prediction result of a first phoneme in the currently input phoneme based on a character and a punctuation of the currently input phoneme, and stores the second prediction result, and the terminal device continues to input a phoneme other than the first phoneme in the currently input phoneme and a next phoneme in the to-be-recognized phonemes into the first multitask neural network model. 2.3. If the total length of the to-be-recognized phoneme is not less than the phoneme length threshold, when the input of all the to-be-recognized phonemes into the first multitask neural network model is completed, a second prediction result of the currently input phoneme is obtained based on the character and the punctuation of the currently input phoneme. 2.4. If there is no stored second prediction result, the second prediction result of the currently input phoneme is used as the first prediction result of the to-be-recognized phoneme. 2.5. If there is a stored second prediction result, the first prediction result of the to-be-recognized phoneme is obtained based on the second prediction result of the currently input phoneme and the stored second prediction result.

The terminal device may set the phoneme length threshold. When the total length of the to-be-recognized phoneme is less than the phoneme length threshold, the terminal device may input the to-be-recognized phoneme into the first multitask neural network model for inference, and use an obtained prediction result as a final result. When the total length of the to-be-recognized phoneme is greater than the phoneme length threshold, the terminal device may input the to-be-recognized phoneme into the first multitask neural network model one by one for inference; and when the length of the currently input phoneme is not less than the phoneme length threshold, store the prediction result of the first phoneme in the currently input phoneme as a final result, continue to input a next to-be-recognized phoneme, and continue inference, until a last to-be-recognized phoneme is input. The prediction result of the currently input phoneme is used as a final result, and a final result of the to-be-recognized phoneme may be obtained by fusing the final result of the currently input phoneme and the stored final result.

Figure 13:
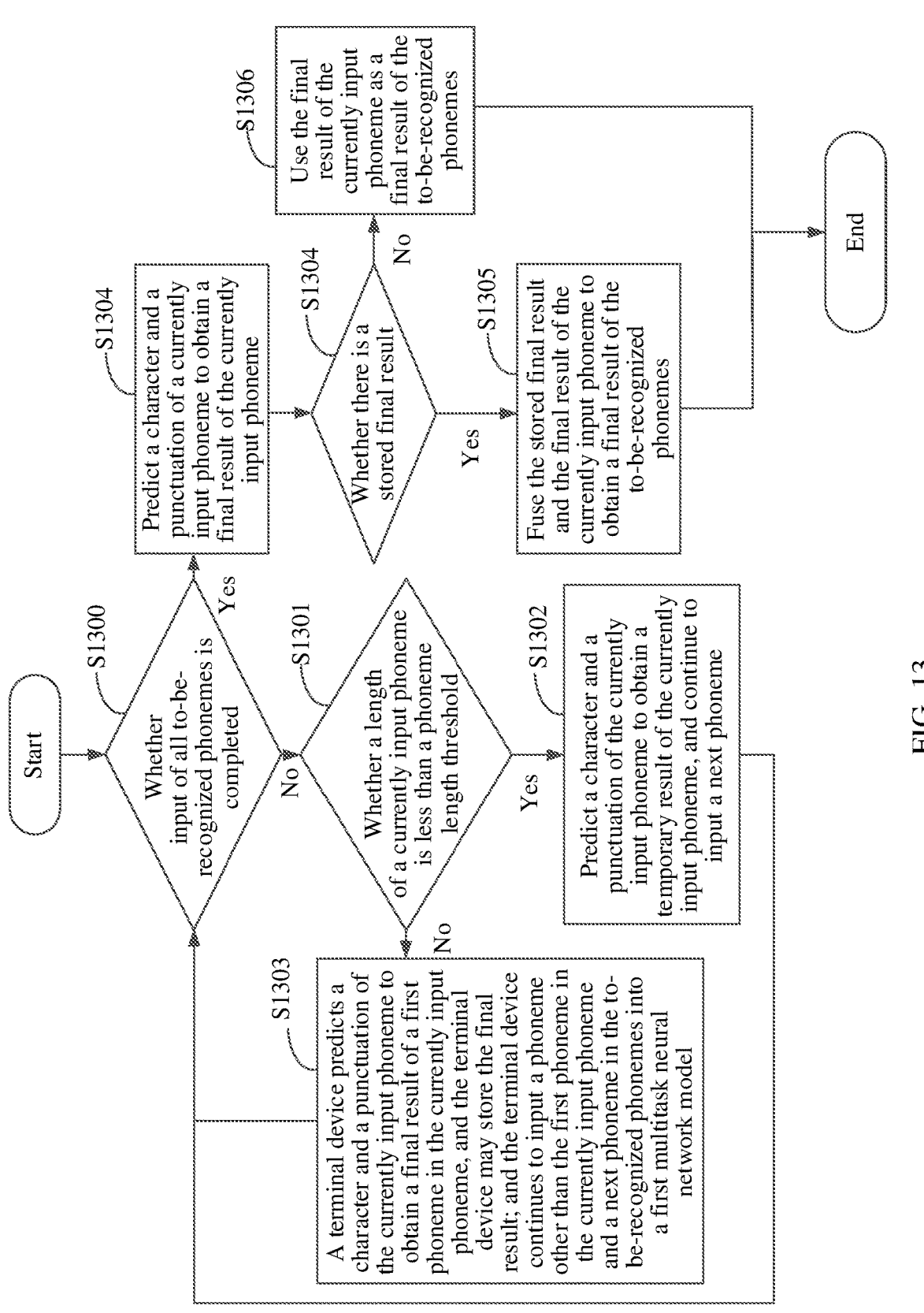
FIG. 13 is a flowchart of a speech recognition method according to an implementation of this application.

FIG. 13 is a flowchart of a speech recognition method according to an implementation of this application. As shown in FIG. 13, the speech recognition method in this implementation may include the following steps.

Step S1300: Determine whether input of all to-be-recognized phonemes is completed. If the input of all the to-be-recognized phonemes is not completed, step S1301 is performed. If the input of all the to-be-recognized phonemes is completed, step S1304 is performed.

Step S1301: Determine whether a length of a currently input phoneme is less than a phoneme length threshold. If the length of the currently input phoneme is less than the phoneme length threshold, step S1302 is performed. If the length of the currently input phoneme is not less than the phoneme length threshold, step S1303 is performed.

Step S1302: Predict a character and a punctuation of the currently input phoneme to obtain a temporary result of the currently input phoneme, continue to input a next phoneme, and return to step S1300.

Step S1303: Predict a character and a punctuation of the currently input phoneme to obtain a final result of a first phoneme in the currently input phoneme. A terminal device may store the final result. The terminal device continues to input a phoneme other than the first phoneme in the currently input phoneme and a next phoneme in the to-be-recognized phonemes into the first multitask neural network model; and returns to step S1300.

Step S1304: Predict a character and a punctuation of the currently input phoneme to obtain a final result of the currently input phoneme, and determine whether there is a stored final result. If there is a stored final result, step S1305 is performed. If there is no stored final result, step S1306 is performed.

Step S1305: Fuse the stored final result and the final result of the currently input phoneme to obtain a final result of the to-be-recognized phoneme, and end the loop.

Step S1306: Use the final result of the currently input phoneme as a final result of the to-be-recognized phoneme, and end the loop.

Compared with the implementation in FIG. 11, in the implementation in FIG. 13, the terminal device determines whether the length of the currently input phoneme is less than the phoneme length threshold. When character prediction and punctuation prediction are performed on the phoneme, a phoneme after the phoneme is referenced. A quantity of referenced phonemes is the phoneme length threshold. In this embodiment of this application, the terminal device may set the phoneme length threshold to 32. It may be understood that the phoneme length threshold may be set based on an actual requirement. This is not specifically limited in this application.

In step S1303, if the length of the currently input phoneme is not less than the phoneme length threshold, the terminal device stores the final result of the first phoneme in the currently input phoneme, but does not use a feature vector of the first phoneme as an input for next inference. Instead, the phoneme other than the first phoneme in the currently input phoneme and the next phoneme in the to-be-recognized phonemes continue to be input into the first multitask neural network model for inference.

For example, it is assumed that the phoneme length threshold is 32. When a total length of to-be-recognized phonemes is less than 32, the terminal device inputs the to-be-recognized phonemes into the first multitask neural network model one by one. If a length of all currently input phonemes is less than 32, when anew to-be-recognized phoneme is input, the terminal device performs inference by using the first multitask neural network model to determine a temporary result of the currently input to-be-recognized phoneme, and refreshes, based on all the currently input to-be-recognized phonemes, a temporary result of a phoneme before the currently input to-be-recognized phonemes. The foregoing process is repeated, until all the to-be-recognized phonemes are input into the first multitask neural network model, and a result obtained through inference is a final result.

It is assumed that an input is ' 春眠不觉晓　处处闻啼鸟。 When 'chun1' is input, an actual vector input into the first multitask neural network model is [chun1, 0, 0, 0, . . . , 0], and 0 to 32 digits are added to an empty place. An output is [ 春0, 0, . . . , 0]. When a next phoneme 'mian2' is input, 'chun1 mian2' may be input into the first multitask neural network model together. An input is [chun1, mian2, 0, 0, . . . , 0], and an output is [ 春 眠0, 0, . . . , 0]. An obtained result refreshes an original temporary result of the phoneme "chun". The foregoing process is repeated, until [chun1, mian2, bu, jue, xiao, chu, chu, wen, ti, niao0, 0, . . . , 0] is input into the first multitask neural network model and a final result is obtained.

When the total length of the to-be-recognized phonemes is not less than 32, the to-be-recognized phonemes are input into the first multitask neural network model one by one. When the length of the currently input phoneme is not less than 32, a process is the same as the foregoing process in which the total length is less than 32. Details are not described again. When the length of the currently input phoneme is not less than 32, the prediction result of the first phoneme in the currently input phoneme is stored as a final result. The phoneme other than the first phoneme in the currently input phoneme and the next phoneme in the to-be-recognized phonemes continue to be input into the first multitask neural network model, and inference is continued. This process is repeated, until a final result is obtained through inference after the last phoneme in the to-be-recognized phonemes is input, and the previously stored final result is fused with 32 final results of last recognition to obtain a final result of the to-be-recognized phonemes.

According to the speech recognition method in the foregoing implementation of this application, the non-streaming network structure is used, and a phoneme of which a result has been predicted does not need to be input into a network model again. Compared with the streaming network structure, the non-streaming network structure does not need to buffer a predicted historical result, so that occupied memory space is reduced. A size of the neural network model can be further reduced, so that the neural network model is easy to deploy on a terminal side. In addition, compared with the streaming network structure, although calculation workload in the non-streaming network structure is heavy, there is no operator such as concatenation or segmentation in a network, and a time-consuming operation such as memory transfer is not required. In a highly parallel computing device such as a GPU, quick inference can be performed.

Based on the foregoing description of the speech recognition method in this application from the training sample set construction process to the model inference process, it can be learned that, to resolve a technical problem in a related speech recognition technology that a model cannot be deployed on a terminal side and prediction accuracy of predicting a punctuation by using an acoustic model is low, this application provides a speech recognition method according to an implementation. The method specifically includes the following steps.

A terminal device inputs a to-be-recognized phoneme into a first multitask neural network model, where the first multitask neural network model is obtained by training a second multitask neural network model by using a training sample, the training sample includes a sample statement, the sample statement includes a character, and the training sample includes a phoneme and a punctuation that correspond to the character in the sample statement.

The terminal device outputs a first prediction result by using the first multitask neural network model, where the first prediction result includes a character prediction result and a punctuation prediction result that correspond to the to-be-recognized phoneme.

The terminal device displays at least a part of the first prediction result on a display of the terminal device based on the first prediction result.

For a specific process, refer to the foregoing description of the process of the speech recognition method in FIG. 10. Details are not described again.

According to the speech recognition method in this implementation of this application, a neural network model for simultaneously predicting a character and a punctuation corresponding to a phoneme is constructed, and a training sample set is constructed to train the neural network model, to obtain a trained neural network model. In a training process, word segmentation processing may not need to be performed, a phoneme (vector) converted from a to-be-recognized speech is used as an input of the trained neural network model, forward inference is performed, and a character and a punctuation corresponding to the phoneme may be simultaneously output. In addition, the neural network model is small-sized, and can be deployed on a terminal side.

To further resolve a technical problem in the related technology that prediction results cannot be simultaneously output when input and output lengths are different, in this implementation of this application, the length of the character in the sample statement in the constructed training sample is the same as the length of the phoneme and the length of the punctuation. In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

In a possible implementation, the first multitask neural network model is a streaming network structure, and that a terminal device inputs a to-be-recognized phoneme into a first multitask neural network model, and outputs a first prediction result by using the first multitask neural network model may include: cyclically inputting, by the terminal device, the to-be-recognized phoneme into the first multitask neural network model, and outputting the first prediction result based on a length of a currently input to-be-recognized phoneme by using the first multitask neural network model. In this way, a prediction result of the to-be-recognized phoneme refers to both a previous phoneme and a subsequent phoneme, so that prediction accuracy is improved.

In a possible implementation, the cyclically inputting, by the terminal device, the to-be-recognized phoneme into the first multitask neural network model, and outputting the first prediction result based on a length of a currently input to-be-recognized phoneme by using the first multitask neural network model may include:

before input of all to-be-recognized phonemes into the first multitask neural network model is completed, if the length of the currently input phoneme is less than a receptive field, continuing, by the terminal device, to input a next phoneme; or before input of all to-be-recognized phonemes into the first multitask neural network model is completed, if the length of the currently input phoneme is not less than a receptive field, obtaining, by the terminal device, a second prediction result of a first phoneme in the currently input phoneme based on a character and a punctuation of the currently input phoneme, and storing the second prediction result; and continuing, by the terminal device, to input a feature vector of the first phoneme, a phoneme other than the first phoneme in the currently input phoneme, and a next phoneme in the to-be-recognized phonemes into the first multitask neural network model.

In a possible implementation, the cyclically inputting, by the terminal device, the to-be-recognized phoneme into the first multitask neural network model, and outputting the first prediction result based on a length of a currently input to-be-recognized phoneme by using the first multitask neural network model may further include:

when the input of all the to-be-recognized phonemes into the first multitask neural network model is completed, obtaining, by the terminal device, a second prediction result of the currently input phoneme based on the character and the punctuation of the currently input phoneme; and if there is no stored second prediction result, using the second prediction result of the currently input phoneme as the first prediction result of the to-be-recognized phoneme; or if there is a stored second prediction result, obtaining the first prediction result of the to-be-recognized phoneme based on the second prediction result of the currently input phoneme and the stored second prediction result.

For a specific example of a process of performing inference by using the streaming network structure, refer to the descriptions in FIG. 11 and FIG. 12. It should be noted that, the inference processes in FIG. 11 and FIG. 12 are merely some examples of this application, and step execution sequences and specific values thereof constitute no limitation on this application in any manner.

According to the speech recognition method in the foregoing implementation of this application, the to-be-recognized phoneme output by an acoustic model is cyclically input into the first multitask neural network model with a streaming network structure, so that a prediction result of the to-be-recognized phoneme refers to both a previous phoneme and a subsequent phoneme, and prediction accuracy is improved.

In a possible implementation, the first multitask neural network model is a non-streaming network structure; and that the terminal device outputs a first prediction result by using the first multitask neural network model may include: outputting, by the terminal device, the first prediction result based on a relationship between a total length of the to-be-recognized phoneme and a phoneme length threshold by using the first multitask neural network model.

In a possible implementation, the outputting, by the terminal device, the first prediction result based on a relationship between a total length of the to-be-recognized phoneme and a phoneme length threshold by using the first multitask neural network model may include:

if the total length of the to-be-recognized phoneme is less than the phoneme length threshold, outputting the first prediction result based on all to-be-recognized phonemes by using the first multitask neural network model.

In a possible implementation, the outputting, by the terminal device, the first prediction result based on a relationship between a total length of the to-be-recognized phoneme and a phoneme length threshold by using the first multitask neural network model may further include:

if the total length of the to-be-recognized phoneme is not less than the phoneme length threshold, before input of all the to-be-recognized phonemes into the first multitask neural network model is completed, if a length of a currently input phoneme is less than the phoneme length threshold, continuing, by the terminal device, to input a next phoneme; or if a length of a currently input phoneme is not less than the phoneme length threshold, obtaining, by the terminal device, a second prediction result of a first phoneme in the currently input phoneme based on a character and a punctuation of the currently input phoneme, storing the second prediction result, and continuing, by the terminal device, to input a phoneme other than the first phoneme in the currently input phoneme and a next phoneme in the to-be-recognized phonemes into the first multitask neural network model.

In a possible implementation, the outputting the first prediction result based on a relationship between a total length of the to-be-recognized phoneme and a phoneme length threshold by using the first multitask neural network model may further include:

if the total length of the to-be-recognized phoneme is not less than the phoneme length threshold, when the input of all the to-be-recognized phonemes into the first multitask neural network model is completed, obtaining a second prediction result of the currently input phoneme based on the character and the punctuation of the currently input phoneme; and if there is no stored second prediction result, using the second prediction result of the currently input phoneme as the first prediction result of the to-be-recognized phoneme; or if there is a stored second prediction result, obtaining the first prediction result of the to-be-recognized phoneme based on the second prediction result of the currently input phoneme and the stored second prediction result.

For a specific example of a process of performing inference by using the non-streaming network structure, refer to the descriptions in FIG. 13. It should be noted that, the inference process in FIG. 13 is merely some examples of this application, and step execution sequences and specific values thereof constitute no limitation on this application in any manner.

According to the speech recognition method in the foregoing implementation of this application, the non-streaming network structure is used, and a phoneme of which a result has been predicted does not need to be input into a network model again. Compared with the streaming network structure, the non-streaming network structure does not need to buffer a predicted historical result, so that occupied memory space is reduced. A size of the neural network model can be further reduced, so that the neural network model is easy to deploy on a terminal side. In addition, because operations such as splicing and segmentation do not need to be performed on a historical result and a currently input phoneme in a calculation process, an inference speed can be improved, and real-time output effect is remarkable in long speech recognition.

This application further provides a neural network model training method. The method includes:

constructing a training sample, where the training sample includes a sample statement, the sample statement includes a character, and the training sample further includes a phoneme and a punctuation that correspond to the character in the sample statement; and training a second multitask neural network model by using the training sample to obtain a first multitask neural network model, where both the second multitask neural network model and the first multitask neural network model can output a first prediction result and display at least a part of the first prediction result, the first prediction result includes a character prediction result and a punctuation prediction result, and the character and the punctuation of the phoneme are simultaneously predicted.

According to the neural network model training method in this implementation of this application, a neural network model for simultaneously predicting a character and a punctuation corresponding to a phoneme is constructed, and a training sample set is constructed to train the neural network model, to obtain a trained neural network model. In a training process, word segmentation processing may not need to be performed, a phoneme (vector) converted from a to-be-recognized speech is used as an input of the trained neural network model, forward inference is performed, and a character and a punctuation corresponding to the phoneme may be simultaneously output. In addition, the neural network model is small-sized, and can be deployed on a terminal side.

To further resolve a technical problem that prediction results cannot be simultaneously output in a scenario in which an input sequence and an output sequence have different lengths in a related technology, in a possible implementation, the constructing a training sample may include:

performing phonetic annotation on the character in the sample statement based on a phonetic annotation dictionary to obtain the phoneme corresponding to the character, and aligning the phoneme corresponding to the character with the character and the punctuation, so that a length of the character in the sample statement is the same as a length of the phoneme and a length of the punctuation.

In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

In a possible implementation, a phoneme corresponding to an aligned Chinese polyphonic character is any one of a plurality of phonemes corresponding to the polyphonic character; an aligned English character includes the alignment character, and a length of the aligned English character is the same as the length of the phoneme corresponding to the English character; and for a character having no punctuation before alignment, an aligned punctuation is blank. Specifically, the aligning the phoneme corresponding to the character with the character and the punctuation may include:

for a Chinese polyphonic character, selecting any phoneme from a plurality of phonemes corresponding to the polyphonic character as a phoneme corresponding to the polyphonic character;

for an English character, adding an alignment character to the character for alignment with a length of a phoneme corresponding to the character; and if there is no punctuation after the character, setting a punctuation corresponding to the character to blank, so that a length of the punctuation is aligned with the length of the character.

For the English character, a location at which the alignment character is added to the character may be on two sides of, for example, before or after, the character that needs to be aligned. That is, left alignment or right alignment may be performed on the character and the phoneme. Right alignment may be adding the alignment character to a left side of the character that needs to be aligned, and left alignment may be adding the alignment character to a right side of the character that needs to be aligned. For a form of the alignment character and an addition manner, refer to the foregoing description in FIG. 7, and details are not described again. In addition, the foregoing three steps of alignment processing may be performed separately, or may be performed simultaneously. This is not limited in this application.

In a possible implementation, the training a second multitask neural network model by using the training sample to obtain a first multitask neural network model may include:

inputting the training sample into the second multitask neural network model, and determining a character probability matrix and a punctuation probability matrix that correspond to the training sample;

separately calculating a character cross entropy loss and a punctuation cross entropy loss based on the character probability matrix and the punctuation probability matrix;

calculating a weighted cross entropy loss based on the character cross entropy loss, a first weight corresponding to the character cross entropy loss, the punctuation cross entropy loss, and a second weight corresponding to the punctuation cross entropy loss; and adjusting a parameter of the second multitask neural network model based on the weighted cross entropy loss, to obtain the trained first multitask neural network model.

For specific description of a training process, refer to the content in FIG. 8. Details are not described again.

According to the multitask neural network model training method in this application, simultaneous training for both character prediction and punctuation prediction tasks can be implemented. In addition, because a constructed training sample set includes a plurality of languages, the multitask neural network model training method in this application may further implement training for a recognition (prediction) task for the plurality of languages. A multitask neural network model trained according to the multitask neural network model training method in this implementation of this application can simultaneously perform prediction for a plurality of languages and punctuations. In addition, compared with a conventional acoustic model, the multitask neural network model is small-sized, and can be deployed on a terminal side.

Figure 14:
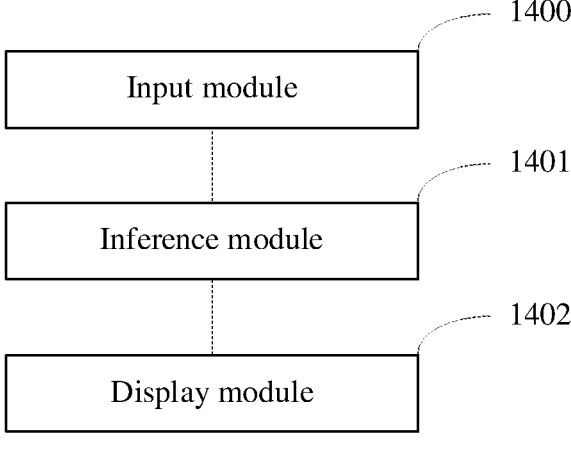
FIG. 14 is a block diagram of a speech recognition apparatus according to an embodiment of this application.

An embodiment of this application further provides a speech recognition apparatus, which may be used in the terminal device shown in FIG. 1 or FIG. 3. FIG. 14 is a block diagram of a speech recognition apparatus according to an embodiment of this application. As shown in FIG. 14, the speech recognition apparatus may include:

an input module 1400, configured to input a to-be-recognized phoneme into a first multitask neural network model, where the first multitask neural network model is obtained by training a second multitask neural network model by using a training sample, the training sample includes a sample statement, the sample statement includes a character, and the training sample further includes a phoneme and a punctuation that correspond to the character in the sample statement;

an inference module 1401, configured to output a first prediction result by using the first multitask neural network model, where the first prediction result includes a character prediction result and a punctuation prediction result that correspond to the to-be-recognized phoneme; and a display module 1402, configured to display at least a part of the first prediction result on a display of the terminal device based on the first prediction result.

According to the speech recognition apparatus in this implementation of this application, a neural network model for simultaneously predicting and outputting a character and a punctuation corresponding to a phoneme is constructed, and a training sample set is constructed to train the neural network model, to obtain a trained neural network model. In a training process, word segmentation processing may not need to be performed, a phoneme (vector) converted from a to-be-recognized speech is used as an input of the trained neural network model, forward inference is performed, and a character and a punctuation corresponding to the phoneme may be simultaneously output. In addition, the neural network model is small-sized, and can be deployed on a terminal side.

In a possible implementation, a length of the character in the sample statement is the same as a length of the phoneme and a length of the punctuation.

In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

In a possible implementation, the first multitask neural network model is a streaming network structure; the input module 1400 may include: a first input unit, configured to cyclically input the to-be-recognized phoneme into the first multitask neural network model; and the inference module 1401 includes: a first inference unit, configured to output the first prediction result based on a length of a currently input to-be-recognized phoneme by using the first multitask neural network model. In this way, a prediction result of the to-be-recognized phoneme refers to both a previous phoneme and a subsequent phoneme, so that prediction accuracy is improved.

In a possible implementation, the first input unit is further configured to: before input of all to-be-recognized phonemes into the first multitask neural network model is completed, if the length of the currently input phoneme is less than a receptive field, continue to input a next phoneme; or before input of all to-be-recognized phonemes into the first multitask neural network model is completed, if the length of the currently input phoneme is not less than a receptive field, the first inference unit is configured to obtain a second prediction result of a first phoneme in the currently input phoneme based on a character and a punctuation of the currently input phoneme, and store the second prediction result; and continue to input a feature vector of the first phoneme, a phoneme other than the first phoneme in the currently input phoneme, and a next phoneme in the to-be-recognized phonemes into the first multitask neural network model.

In a possible implementation, the first inference unit is further configured to: when the input of all the to-be-recognized phonemes into the first multitask neural network model is completed, obtain a second prediction result of the currently input phoneme based on the character and the punctuation of the currently input phoneme; and if there is no stored second prediction result, use the second prediction result of the currently input phoneme as the first prediction result of the to-be-recognized phoneme; or if there is a stored second prediction result, obtain the first prediction result of the to-be-recognized phoneme based on the second prediction result of the currently input phoneme and the stored second prediction result.

According to the speech recognition apparatus in the foregoing implementation of this application, the to-be-recognized phoneme output by an acoustic model is cyclically input into the first multitask neural network model with a streaming network structure, so that a prediction result of the to-be-recognized phoneme refers to both a previous phoneme and a subsequent phoneme, and prediction accuracy is improved.

In a possible implementation, the first multitask neural network model is a non-streaming network structure; and the inference module 1401 includes:

a second inference unit, configured to output the first prediction result based on a relationship between a total length of the to-be-recognized phoneme and a phoneme length threshold by using the first multitask neural network model.

In a possible implementation, the second inference unit is further configured to: if the total length of the to-be-recognized phoneme is less than the phoneme length threshold, output the first prediction result based on all to-be-recognized phonemes by using the first multitask neural network model.

In a possible implementation, the second inference unit is further configured to:

if the total length of the to-be-recognized phoneme is not less than the phoneme length threshold, before input of all the to-be-recognized phonemes into the first multi-task neural network model is completed, if a length of a currently input phoneme is less than the phoneme length threshold, continue to input a next phoneme; or if a length of a currently input phoneme is not less than the phoneme length threshold, obtain a second prediction result of a first phoneme in the currently input phoneme based on a character and a punctuation of the currently input phoneme, store the second prediction result, and continue to input a phoneme other than the first phoneme in the currently input phoneme and a next phoneme in the to-be-recognized phonemes into the first multitask neural network model.

In a possible implementation, the second inference unit is further configured to:

if the total length of the to-be-recognized phoneme is not less than the phoneme length threshold, when the input of all the to-be-recognized phonemes into the first multitask neural network model is completed, obtain a second prediction result of the currently input phoneme based on the character and the punctuation of the currently input phoneme; and if there is no stored second prediction result, use the second prediction result of the currently input phoneme as the first prediction result of the to-be-recognized phoneme; or if there is a stored second prediction result, obtain the first prediction result of the to-be-recognized phoneme based on the second prediction result of the currently input phoneme and the stored second prediction result.

According to the speech recognition apparatus in the foregoing implementation of this application, the non-streaming network structure is used, and a phoneme of which a result has been predicted does not need to be input into a network model again. Compared with the streaming network structure, the non-streaming network structure does not need to buffer a predicted historical result, so that occupied memory space is reduced. A size of the neural network model can be further reduced, so that the neural network model is easy to deploy on a terminal side. In addition, because operations such as splicing and segmentation do not need to be performed on a historical result and a currently input phoneme in a calculation process, an inference speed can be improved, and real-time output effect is remarkable in long speech recognition.

Figure 15:
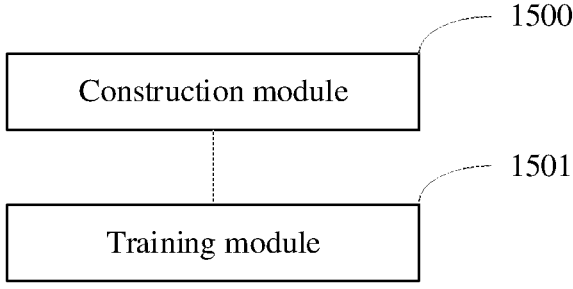
FIG. 15 is a block diagram of a neural network model training apparatus according to an embodiment of this application.

An embodiment of this application further provides a neural network model training apparatus. FIG. 15 is a block diagram of a neural network model training apparatus according to an embodiment of this application. As shown in FIG. 15, the neural network model training apparatus may include:

a construction module 1500, configured to construct a training sample, where the training sample includes a sample statement, the sample statement includes a character, and the training sample further includes a phoneme and a punctuation that correspond to the character in the sample statement; and a training module 1501, configured to train a second multitask neural network model by using the training sample to obtain a first multitask neural network model, where both the second multitask neural network model and the first multitask neural network model can output a first prediction result and display at least a part of the first prediction result, the first prediction result includes a character prediction result and a punctuation prediction result, and the character and the punctuation of the phoneme are simultaneously predicted.

According to the neural network training apparatus in this implementation of this application, a neural network model that can simultaneously perform phoneme-to-character conversion and punctuation prediction is constructed, and a training sample set is constructed to train the neural network model, to obtain a trained neural network model. In a training process, word segmentation processing does not need to be performed, a phoneme (vector) converted from a to-be-recognized speech is used as an input of the trained neural network model, forward inference is performed, and a character and a punctuation corresponding to the phoneme may be simultaneously output. In addition, the neural network model is small-sized, and can be deployed on a terminal side.

In a possible implementation, the construction module 1500 includes:

an alignment unit, configured to perform phonetic annotation on the character in the sample statement based on a phonetic annotation dictionary to obtain the phoneme corresponding to the character, and align the phoneme corresponding to the character with the character and the punctuation, so that a length of the character in the sample statement is the same as a length of the phoneme and a length of the punctuation.

In a possible implementation, a phoneme corresponding to an aligned Chinese polyphonic character is any one of a plurality of phonemes corresponding to the polyphonic character; an aligned English character includes the alignment character, and a length of the aligned English character is the same as the length of the phoneme corresponding to the English character; and for a character having no punctuation before alignment, an aligned punctuation is blank. Specifically, the alignment unit is further configured to:

for a Chinese polyphonic character, select any phoneme from a plurality of phonemes corresponding to the polyphonic character as a phoneme corresponding to the polyphonic character;

for an English character, add an alignment character to the character for alignment with a length of a phoneme corresponding to the character; and if there is no punctuation after the character, set a punctuation corresponding to the character to blank, so that a length of the punctuation is aligned with the length of the character.

In a process of constructing a training sample set, the length of the character in the sample statement is aligned with the length of the phonetic-annotated phoneme and the length of the punctuation. After a neural network model is trained by using the training sample set constructed in this implementation of this application, the neural network model can simultaneously perform phoneme-to-character conversion and punctuation prediction, so that a predicted character result and a predicted punctuation result can be simultaneously output.

In a possible implementation, the training module 1501 includes:

a determining unit, configured to input the training sample into the second multitask neural network model, and determine a character probability matrix and a punctuation probability matrix that correspond to the training sample;

a first calculation unit, configured to separately calculate a character cross entropy loss and a punctuation cross entropy loss based on the character probability matrix and the punctuation probability matrix;

a second calculation unit, configured to calculate a weighted cross entropy loss based on the character cross entropy loss, a first weight corresponding to the character cross entropy loss, the punctuation cross entropy loss, and a second weight corresponding to the punctuation cross entropy loss; and an adjustment unit, configured to adjust a parameter of the second multitask neural network model based on the weighted cross entropy loss, to obtain the trained first multitask neural network model.

According to the multitask neural network model training apparatus in this application, simultaneous training for both character prediction and punctuation prediction tasks can be implemented. In addition, because a constructed training sample set includes a plurality of languages, the multitask neural network model training method in this application may further implement training for a recognition (prediction) task for the plurality of languages. A multitask neural network model trained according to the multitask neural network model training apparatus in this implementation of this application can simultaneously perform prediction for a plurality of languages and punctuations. In addition, compared with a conventional acoustic model, the multitask neural network model is small-sized, and can be deployed on a terminal side.

An embodiment of this application provides a speech recognition apparatus, including: a processor and a memory configured to store instructions executable for the processor. The processor is configured to implement the foregoing method when executing the instructions.

An embodiment of this application provides a neural network model training apparatus, including: a processor and a memory configured to store instructions executable for the processor. The processor is configured to implement the foregoing method when executing the instructions.

An embodiment of this application provides a non-volatile computer-readable storage medium. The non-volatile computer-readable storage medium stores computer program instructions. When the computer program instructions are executed by a processor, the foregoing methods are implemented.

An embodiment of this application provides a computer program product, including computer-readable code or a non-volatile computer-readable storage medium carrying computer-readable code. When the computer-readable code is run in a processor of an electronic device, the processor in the electronic device performs the foregoing methods.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (non-exhaustive list) of the computer-readable storage medium include: a portable computer disk, a hard disk, a random access memory (RAM), a read-only memory (ROM), an electrically programmable read-only memory (EPROM or flash memory), a static random access memory (SRAM), a compact disc read-only memory (CD-ROM), a digital video disc (DVD), a memory stick, a floppy disk, a mechanical encoding device such as a punched card or an in-groove protrusion structure on which instructions are stored, and any suitable combination of the foregoing.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of a plurality of programming languages. The programming languages include object-oriented programming languages such as Smalltalk and C++, and a conventional procedural programming language such as "C" or a similar programming language. The computer-readable program instructions may be executed entirely on a user computer, executed partially on a user computer, executed as a standalone software package, executed partially on a user computer and partially on a remote computer, or executed entirely on a remote computer or a server. When a remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, such as a programmable logic circuit, a field-programmable gate array (FPGA), or a programmable logic array (PLA), is personalized by using state information of computer-readable program instructions. The electronic circuit may execute the computer-readable program instructions, to implement various aspects of this application.

The aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided for a processor of a general-purpose computer, a special-purpose computer, or another programmable data processing apparatus to produce a machine, so that the instructions, when being executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the accompanying drawings show architectures, functions, and operations that may be implemented by apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions indicated in the blocks may occur in a different order from that indicated in the drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by using hardware for performing a corresponding function or action (for example, a circuit or an ASIC (application-specific integrated circuit)), or may be implemented by using a combination of hardware and software, such as firmware.

Although this application is described with reference to embodiments, in a process of implementing this application that claims protection, a person skilled in the art may understand and implement another variation of the disclosed embodiments by viewing the accompanying drawings, disclosed content, and appended claims. In the claims, the word "comprise" (comprising) does not exclude another component or step, and "a" or "one" does not exclude a meaning of plurality. A single processor or another unit may implement several functions enumerated in the claims. Some measures are recorded in dependent claims that are different from each other, but this does not indicate that these measures cannot be combined to produce a better effect.

Embodiments of this application are described above. The foregoing descriptions are examples, are not exhaustive, and are not limited to the disclosed embodiments. Many modifications and changes are apparent to a person of ordinary skill in the art without departing from the scope of the illustrated embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A speech recognition method, comprising:
inputting, by a terminal device, a to-be-recognized phoneme into a first multitask neural network model stored in one or more memories of a data processing system;
automatically outputting a first prediction result based on execution by the data processing system of the first multitask neural network model stored in the one or more memories of the data processing system and applied to the to-be-recognized phoneme, wherein the first prediction result comprises a character prediction result and a punctuation prediction result each generated by the first multitask neural network model as applied to the to-be-recognized phoneme and corresponding to the to-be-recognized phoneme; and
displaying, by the terminal device on a display of the terminal device, at least a part of the first prediction result; wherein:
the first multitask neural network model is a streaming network structure; and
the inputting, by a terminal device, a to-be-recognized phoneme into a first multitask neural network model, and outputting a first prediction result using the first multitask neural network model comprises:
cyclically inputting, by the terminal device, the to-be-recognized phoneme into the first multitask neural network model, and outputting the first prediction result based on a length of a currently input to-be-recognized phoneme by using the first multitask neural network model;
or
the first multitask neural network model is a non-streaming network structure; and
the outputting a first prediction result using the first multitask neural network model comprises:
outputting the first prediction result based on a relationship between a total length of the to-be-recognized phoneme and a phoneme length threshold using the first multitask neural network model.

2. The method of claim 1, wherein the first multitask neural network model is obtained by training a second multitask neural network model using a training sample comprising a sample statement, the sample statement comprising a character, a phoneme and punctuation that correspond to the character in the sample statement.

3. The method of claim 2, wherein a length of the character in the sample statement is the same as the combined length of a length of the phoneme and a length of the punctuation.

4. The method of claim 1, wherein the cyclically inputting, by the terminal device, the to-be-recognized phoneme into the first multitask neural network model and outputting the first prediction result based on a length of a currently input to-be-recognized phoneme using the first multitask neural network model comprises:
before input of all to-be-recognized phonemes into the first multitask neural network model is completed, if the length of the currently input phoneme is less than a receptive field, continuing, by the terminal device, to input a next phoneme; or
before input of all to-be-recognized phonemes into the first multitask neural network model is completed, if the length of the currently input phoneme is not less than a receptive field, obtaining, by the terminal device, a second prediction result of a first phoneme in the currently input phoneme based on a character and a punctuation of the currently input phoneme, and storing the second prediction result, and continuing, by the terminal device, to input a feature vector of the first phoneme, a phoneme other than the first phoneme in the currently input phoneme, and a next phoneme in the to-be-recognized phonemes into the first multitask neural network model.

5. The method of claim 1, wherein the cyclically inputting, by the terminal device, the to-be-recognized phoneme into the first multitask neural network model and outputting the first prediction result based on a length of a currently input to-be-recognized phoneme using the first multitask neural network model further comprises:

obtaining, by the terminal device, a second prediction result of the currently input phoneme based on the character and the punctuation of the currently input phoneme when the input of all the to-be-recognized phonemes into the first multitask neural network model is completed; and applying, by the terminal device, the second prediction result of the currently input phoneme as the first prediction result of the to-be-recognized phoneme when there is no stored second prediction result; or obtaining the first prediction result of the to-be-recognized phoneme based on the second prediction result of the currently input phoneme and the stored second prediction result when there is a stored second prediction result.

6. The method of claim 1, wherein the outputting the first prediction result based on a relationship between a total length of the to-be-recognized phoneme and a phoneme length threshold comprises:

outputting the first prediction result based on all to-be-recognized phonemes when the total length of the to-be-recognized phoneme is less than the phoneme length threshold.

7. The method of claim 1, wherein the outputting the first prediction result based on a relationship between a total length of the to-be-recognized phoneme and a phoneme length threshold comprises:

continuing, by the terminal device, to input a next phoneme prior to input of all the to-be-recognized phonemes into the first multitask neural network model is completed when the total length of the to-be-recognized phoneme is not less than the phoneme length threshold, and a length of a currently input phoneme is less than the phoneme length threshold; or obtaining, by the terminal device, a second prediction result of a first phoneme in the currently input phoneme based on a character and a punctuation of the currently input phoneme, storing the second prediction result, and continuing to input a phoneme other than the first phoneme in the currently input phoneme and a next phoneme in the to-be-recognized phonemes into the first multitask neural network model when a length of a currently input phoneme is not less than the phoneme length threshold.

8. The method of claim 7, wherein the outputting the first prediction result based on a relationship between a total length of the to-be-recognized phoneme and a phoneme length threshold using the first multitask neural network model further comprises:

when the input of all the to-be-recognized phonemes into the first multitask neural network model is completed, obtaining a second prediction result of the currently input phoneme based on the character and the punctuation of the currently input phoneme when the total length of the to-be-recognized phoneme is not less than the phoneme length threshold; and using the second prediction result of the currently input phoneme as the first prediction result of the to-be-recognized phoneme when-there is no stored second prediction result; or obtaining the first prediction result of the to-be-recognized phoneme based on the second prediction result of the currently input phoneme and the stored second prediction result when there is a stored second prediction result.

9. A neural network model training method, comprising:

constructing a training sample, the training sample comprising a sample statement comprising a character, and a phoneme and a punctuation that correspond to the character in the sample statement; and training a second multitask neural network model using the training sample to obtain a first multitask neural network model, each of the second multitask neural network model and the first multitask neural network model being configured to output a first prediction result and to display at least a part of the first prediction result, the first prediction result comprising a character prediction result and a punctuation prediction result;

wherein the training a second multitask neural network model comprises:

inputting the training sample into the second multitask neural network model, determining a character probability matrix and a punctuation probability matrix that correspond to the training sample;

separately calculating a character cross entropy loss and a punctuation cross entropy loss based on the character probability matrix and the punctuation probability matrix;

calculating a weighted cross entropy loss based on the character cross entropy loss, a first weight corresponding to the character cross entropy loss, the punctuation cross entropy loss, and a second weight corresponding to the punctuation cross entropy loss; and adjusting a parameter of the second multitask neural network model based on the weighted cross entropy loss to obtain the trained first multitask neural network model.

10. The method of claim 9, wherein the constructing a training sample comprises:

performing phonetic annotation on the character in the sample statement based on a phonetic annotation dictionary to obtain the phoneme corresponding to the character, and aligning the phoneme corresponding to the character with the character and the punctuation so that a length of the character in the sample statement is the same as a length of the phoneme and a length of the punctuation.

11. A speech recognition apparatus, comprising:

an input module configured to input a to-be-recognized phoneme into a first multitask neural network model stored in one or more memories of a data processing system;

an inference module configured to automatically output a first prediction result based on execution by the data processing system of program instructions of the first multitask neural network model stored in the one or more memories of the data processing system and applied to the to-be-recognized phoneme, the first prediction result comprising a character prediction result and a punctuation prediction result each generated by the first multitask neural network model as applied to the to-be-recognized phoneme and corresponding to the to-be-recognized phoneme; and a display module configured to display at least a part of the first prediction result on a display of a terminal device based on the first prediction result; wherein:

the first multitask neural network model is a streaming network structure; and the inputting, by a terminal device, a to-be-recognized phoneme into a first multitask neural network model, and outputting a first prediction result using the first multitask neural network model comprises:

cyclically inputting, by the terminal device, the to-be-recognized phoneme into the first multitask neural network model, and outputting the first prediction result based on a length of a currently input to-be-recognized phoneme by using the first multitask neural network model;

or the first multitask neural network model is a non-streaming network structure; and the outputting a first prediction result using the first multitask neural network model comprises:

outputting the first prediction result based on a relationship between a total length of the to-be-recognized phoneme and a phoneme length threshold using the first multitask neural network model.

12. The apparatus of claim 11, wherein the first multitask neural network model is obtained by the apparatus from training a second multitask neural network model using a training sample comprising a sample statement including a character and a phoneme and punctuation that correspond to the character in the sample statement.

13. The apparatus of claim 12, wherein a length of the character in the sample statement is the same as a length of the phoneme and a length of the punctuation.

14. The apparatus of claim 11, wherein the first multitask neural network model is a streaming network structure;

the input module comprises a first input unit configured to cyclically input the to-be-recognized phoneme into the first multitask neural network model; and the inference module comprises a first inference unit configured to output the first prediction result based on a length of a currently input to-be-recognized phoneme by using the first multitask neural network model.

15. A non-transitory computer-readable storage medium having a computer program code stored thereon, wherein the computer program code comprises instructions that, when run on a processor of terminal device, cause the terminal device to perform steps including:

inputting a to-be-recognized phoneme into a first multitask neural network model stored in one or more memories of the terminal device;

automatically outputting a first prediction result based on execution by the processor of the first multitask neural network model applied to the to-be-recognized phoneme, wherein the first prediction result comprises a character prediction result and a punctuation prediction result each generated by the first multitask neural network model as applied to the to-be-recognized phoneme and corresponding to the to-be-recognized phoneme; and displaying at least a part of the first prediction result on a display of the terminal device based on the first prediction result; wherein:

the first multitask neural network model is a streaming network structure; and the inputting, by a terminal device, a to-be-recognized phoneme into a first multitask neural network model, and outputting a first prediction result using the first multitask neural network model comprises:

cyclically inputting, by the terminal device, the to-be-recognized phoneme into the first multitask neural network model, and outputting the first prediction result based on a length of a currently input to-be-recognized phoneme by using the first multitask neural network model;

or the first multitask neural network model is a non-streaming network structure; and the outputting a first prediction result using the first multitask neural network model comprises:

outputting the first prediction result based on a relationship between a total length of the to-be-recognized phoneme and a phoneme length threshold using the first multitask neural network model.

16. The non-transitory computer-readable storage medium of claim 15, wherein the first multitask neural network model is obtained by training a second multitask neural network model by using a training sample comprising a sample statement including a character, a phoneme and punctuation that correspond to the character in the sample statement.

* * * * *